United States Patent [19]

Baughman

[11] Patent Number: 5,066,065

[45] Date of Patent: Nov. 19, 1991

[54] CONTAINERIZED RETRACTABLE/EXPANDABLE SLEEPING COMPARTMENT FOR VEHICLES

[76] Inventor: Milo Baughman, 560 E. South Temple, Salt Lake City, Utah 84102

[21] Appl. No.: 596,891

[22] Filed: Oct. 11, 1990

Related U.S. Application Data

[63] Continuation-in-part of Ser. No. 366,553, Jun. 15, 1989, Pat. No. 5,011,216.

[51] Int. Cl.$^5$ ............................................. B60P 3/345
[52] U.S. Cl. ................................. 296/165; 296/136; 296/156; 296/159; 296/161; 296/166; 296/167; 296/173; 135/88; 135/95; 135/904; 135/905
[58] Field of Search .................... 296/26, 27, 156, 159, 296/161, 164, 165, 166, 167, 171, 173, 174, 175, 136; 135/88, 95, 904, 905

[56] References Cited

U.S. PATENT DOCUMENTS

| | | | |
|---|---|---|---|
| 1,219,905 | 3/1917 | Barringer | 135/904 X |
| 2,122,681 | 7/1938 | Dykes | 135/88 |
| 2,225,993 | 12/1940 | Hornberger | 296/161 |
| 2,290,786 | 7/1942 | Varady | 5/418 |
| 2,531,501 | 11/1950 | Cline | 135/904 X |
| 2,738,249 | 3/1956 | Tenenblatt | 135/95 X |
| 2,820,666 | 1/1958 | Grochmal | 296/171 |
| 3,115,362 | 12/1963 | Spurrier | 296/164 |
| 3,367,347 | 2/1968 | Smith | 296/26 X |
| 3,375,836 | 4/1968 | Domeneghetti | 135/88 |
| 3,410,598 | 11/1968 | Davis et al. | 296/26 X |
| 3,438,670 | 4/1969 | Salmans | 296/164 |
| 3,463,540 | 8/1969 | Carr | 296/161 |
| 3,466,082 | 9/1969 | Branch | 296/164 |
| 3,649,063 | 3/1972 | Stark | 296/159 |
| 3,823,975 | 7/1974 | Cooper | 296/173 |
| 3,837,700 | 9/1974 | Van Slyke | 296/166 |
| 3,838,884 | 10/1974 | Lefebvre | 296/27 X |
| 3,887,226 | 6/1975 | Hart | 296/26 |
| 3,897,970 | 8/1975 | Gattenby | 296/166 |
| 3,968,809 | 7/1976 | Beavers | 296/26 X |
| 4,027,911 | 6/1977 | Johnson | 296/161 |
| 4,057,283 | 11/1977 | Barnett | 296/173 |
| 4,057,285 | 11/1977 | Bemos | 296/169 |
| 4,065,166 | 12/1977 | Shoemaker | 296/159 |
| 4,093,301 | 6/1978 | Kwok | 135/88 X |
| 4,109,954 | 8/1978 | Wall | 296/161 |
| 4,157,201 | 6/1979 | Collins et al. | 296/156 |
| 4,192,543 | 3/1980 | Crawford | 296/159 |
| 4,192,544 | 3/1980 | Patterson | 296/165 |
| 4,223,689 | 9/1980 | Cox | 296/164 X |
| 4,299,422 | 11/1981 | Pettit | 296/166 |
| 4,310,195 | 1/1982 | Huff | 296/173 |
| 4,462,631 | 7/1984 | Lange | 296/161 X |
| 4,504,049 | 3/1985 | Straub | 296/26 X |
| 4,542,932 | 9/1985 | Whiteman | 296/161 X |
| 4,585,020 | 4/1986 | Masuda et al. | 135/95 |
| 4,729,594 | 3/1988 | Hoff | 296/164 X |
| 4,756,571 | 7/1988 | Lake | 296/165 X |
| 4,858,986 | 8/1989 | Whitley et al. | 296/161 X |
| 4,867,502 | 9/1989 | Sylvester et al. | 296/161 |
| 4,938,523 | 7/1990 | Camp | 296/159 |

FOREIGN PATENT DOCUMENTS

| | | | |
|---|---|---|---|
| 3830801 | 3/1990 | Fed. Rep. of Germany | 296/171 |
| 2617449 | 1/1989 | France | 296/172 |
| 135396 | 4/1952 | Sweden | 296/173 |

*Primary Examiner*—Margaret A. Focarino
*Assistant Examiner*—Andrew C. Pike
*Attorney, Agent, or Firm*—Lynn G. Foster

[57] ABSTRACT

A self-contained temporary shelter comprising an expandable/collapsible sleeping compartment for use in conjunction with a vehicle is described. The temporary shelter is accessible through the interior rear of the vehicle. The sleeping compartment comprises a collapsible/extendable canopy covering and a collapsible/expandable support structure. Said compartment, during non-use, is collapsed and housed in a manually removable container and use thereof requires no material modification to the vehicle. Dust and rain covers are disclosed which attach to the vehicle and comprise protective enclosure for open portals of the vehicle. The sleeping compartment when in the as used, extended or open position is supported at the distal end by terrain engaging columns and defines a sleeping area.

44 Claims, 12 Drawing Sheets

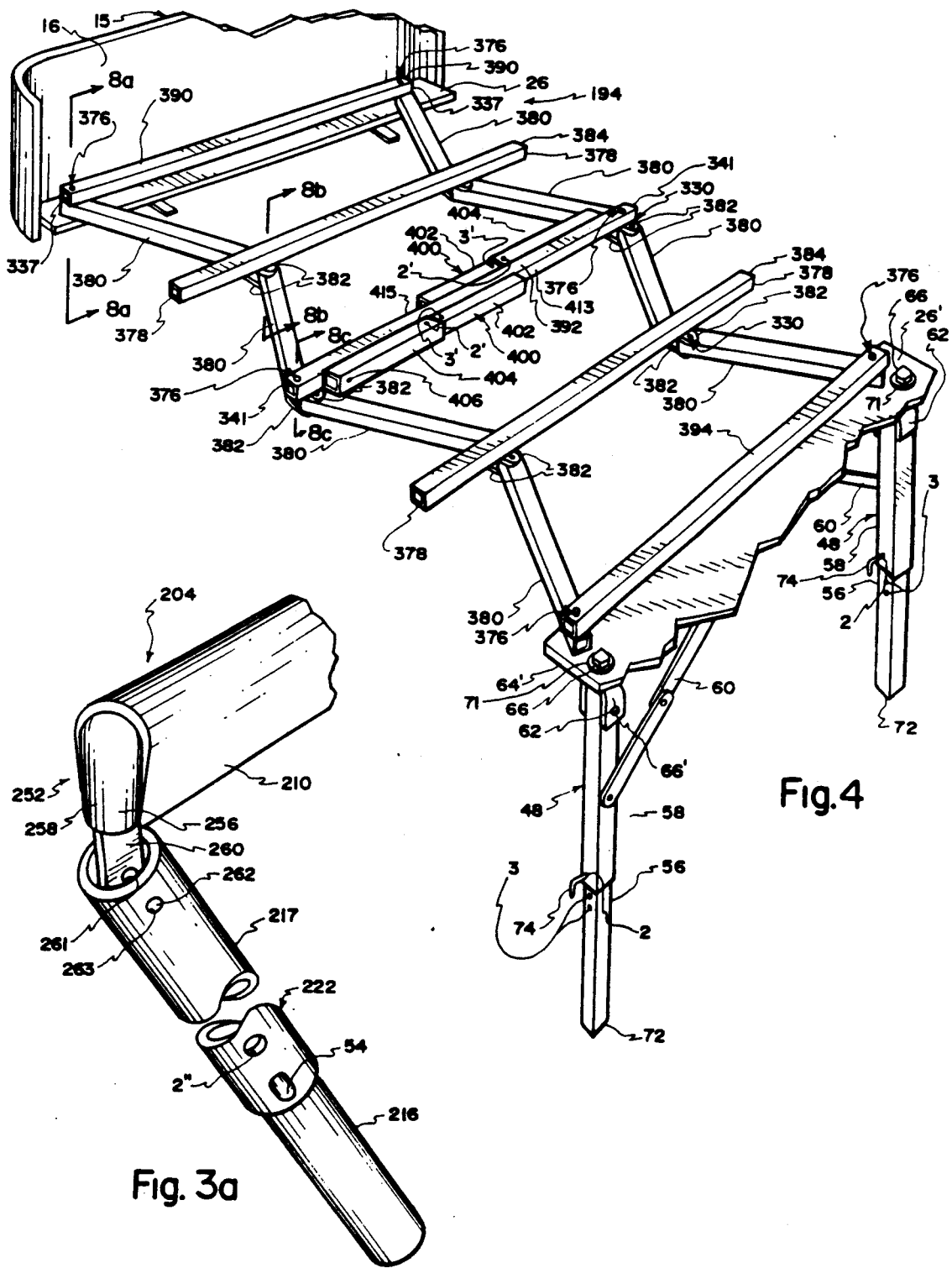

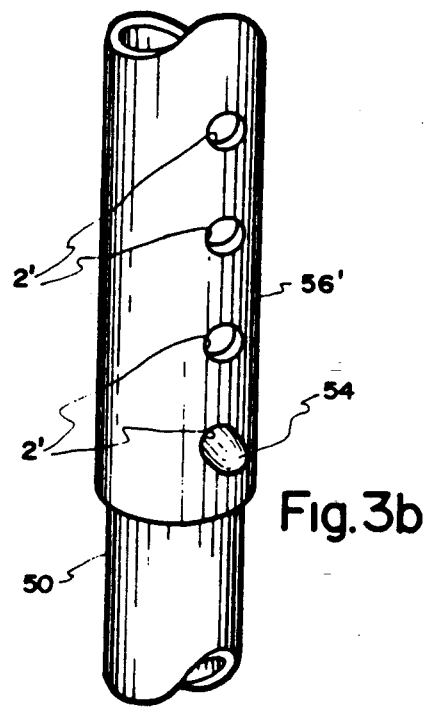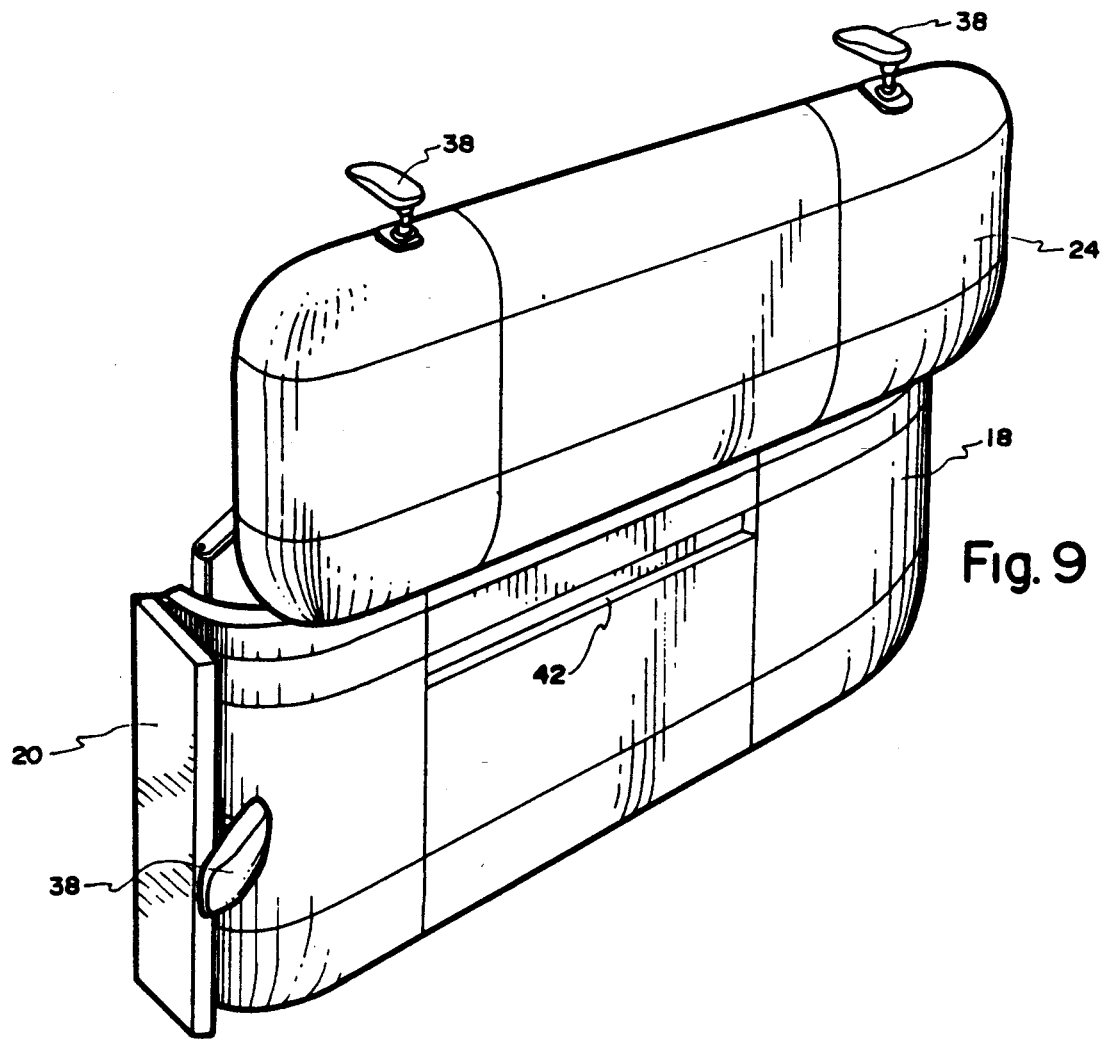

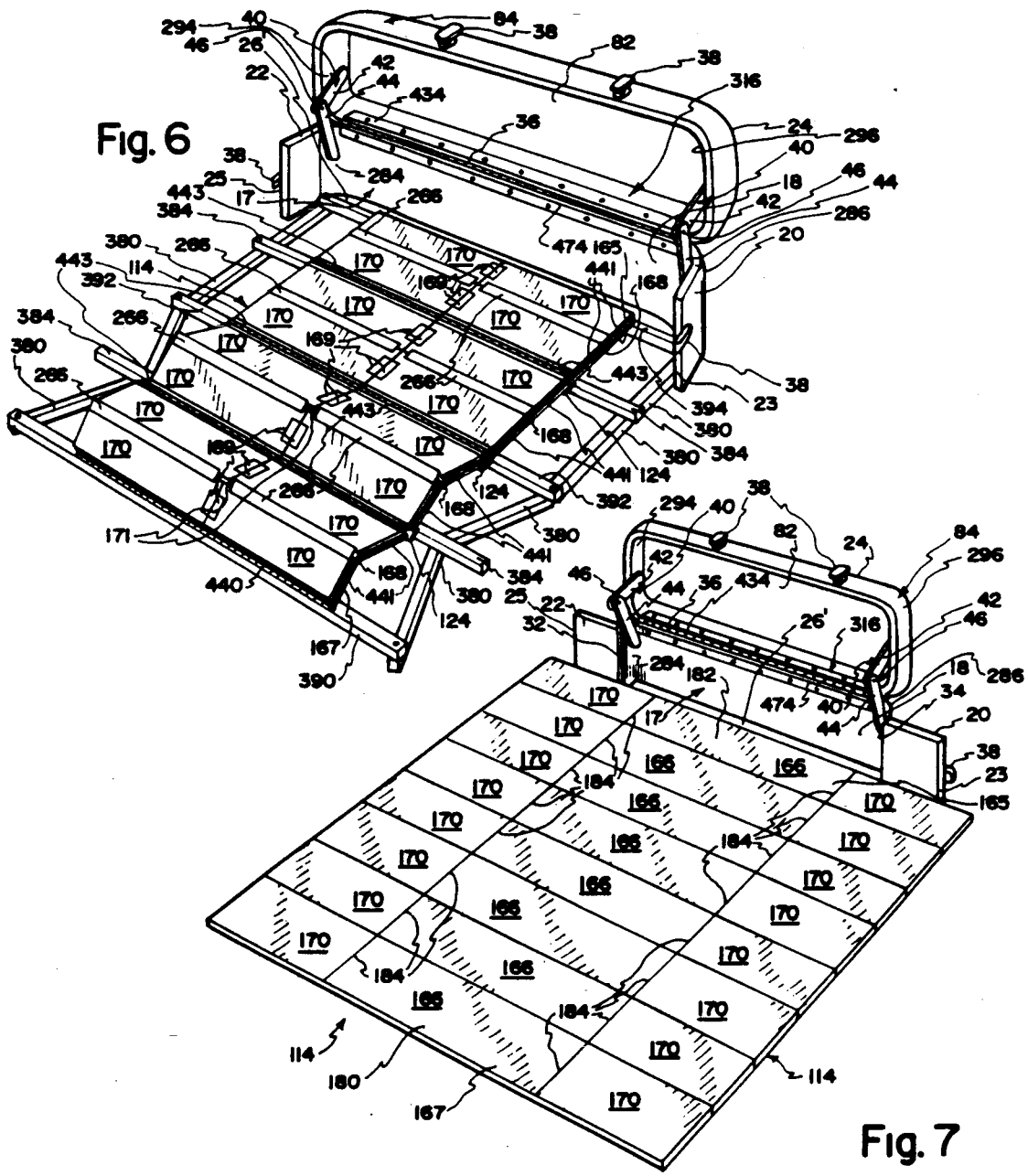

CONTAINERIZED RETRACTABLE/EXPANDABLE SLEEPING COMPARTMENT FOR VEHICLES

CONTINUITY

This application is a continuation-in-part of my co-pending U.S. patent application Ser. No. 366,553, filed June 15, 1989, now U.S. Pat. No. 5,011,216.

FIELD OF THE INVENTION

The present invention relates generally to the expansion of existing vehicle space and more specifically to an impermanent, containerized, removable, extendable/retractable sleeping compartment which is carried by and used with vehicles comprising a rear door or hatch access.

BACKGROUND AND RELEVANT ART

Numerous previous developments and proposals exist in which existing space in a recreational vehicle may be increased or extended at times when that vehicle is at rest. For example, Applicant is aware of the following U.S. Pat. Nos.:

3,887,226, 4,462,631
4,057,285, 4,192,544

While these inventions solve certain problems, particularly those related to lack or limitation of sleeping space, they also present or fail to solve many other problems.

Most of the art mentioned above comprise telescoping devices to extend existing space in recreational vehicles, such as vans or trailers. However, when compacted, these devices significantly reduce the available interior space of the vehicle in such a way as to negatively affect its function, economy and comfort when vehicle use does not comprise use of the device.

Another problem associated with the art mentioned above is the time requirement and difficulty in assembling and disassembling the extension device. This becomes an important consideration when the operator attempts to place the device in use under extreme conditions, such as rain, snow, wind, and darkness.

A further problem not addressed by the art under consideration is a lack of adaptability. Most space extension devices of the past fail to adapt in one or both of two ways. First, some previous devices cannot be adapted for use with existing vehicles. Rather, such devices can only be used when integrated into the initial construction of a recreational vehicle. Second, most such devices which can be used on an existing vehicle cannot be adapted to a wide range of vehicle types.

Finally, most, if not all, previous devices require that permanent alterations be made to the vehicles onto which they are mounted. This means as a practical matter that once such a device has been retrofitted into a specific vehicle, that vehicle cannot thereafter be completely divorced from the device. Any attempts to do so would result in either unsightliness or undue expense.

BRIEF SUMMARY AND OBJECTS OF THE INVENTION

In brief summary, the present invention comprises a manually portable container in which all necessary components of a separate sleeping compartment are stored in an assembled state. The container separates into constructive parts when the sleeping compartment is expanded and erected. The sleeping compartment itself comprises expandable/collapsible frame work and floor structure as well as a flexible covering. The sleeping compartment is adapted to be first removed from the container and thereafter caused to be proximally supported by an opening in the vehicle, typically a rear door, and distally supported by ground or other surface engaging legs.

In the "as stored," closed, or storage position, this invention is fully contained within the container, which is easily kept in the vehicle or at some convenient location outside of the vehicle. To obtain one "as used" or open position, the container is placed and anchored near the desired vehicle opening. The container is then opened and separated and the sleeping compartment manually extended outwardly from the vehicle.

With the foregoing in mind, it is a primary object to provide a novel, containerizable, expandable/retractable sleeping compartment for a vehicle which overcomes or substantially alleviates problems of the past.

It is a principal object of the invention to provide an expandable and collapsible sleeping compartment which is stored substantially independent of a vehicle and yet is quickly and facilely associated with a vehicle and extended beyond the limits of the vehicle into an open, stable sleeping position.

Another significant object is the provision of an expandable and retractable sleeping compartment which requires little vehicle space during storage and/or transportation.

It is a further dominant object to provide a collapsible sleeping compartment which is lightweight, manually portable as is luggage, thus substantially independent of a vehicle during non-use.

Yet another paramount object of the present invention is the provision of an expandable and collapsible sleeping compartment that requires no substantial or extensive modification or alteration to a vehicle in which the compartment is transported and with which the compartment is associated during use.

A further dominant object of the invention is to provide an expandable and collapsible sleeping compartment which is separable from an opening in a vehicle when it is not being used and associated therewith during use.

It is another important object to provide a novel containerized, expandable sleeping compartment for selective use with a vehicle.

These and other objects and features of the present invention will be apparent from the detailed description taken with reference to the accompanying drawings.

BRIEF DESCRIPTION OF THE DRAWINGS

FIG. 3a is a fragmentary perspective view of a center canopy pole hinging and telescoping member;

FIG. 3b is a fragmentary perspective view of telescoping members, one comprising a linear set of holes and the other comprising a locking spring pin shown protruding through one of the holes;

FIG. 4 is a perspective of a partially extended rectangular tubing compartment support frame which folds like an accordion with rear legs fully extended in the vertical direction;

FIG. 6 is a perspective of a presently preferred sleeping platform for the sleeping unit of FIG. 1, shown in a partially extended position from the rear portion of the container of FIG. 2;

FIG. 7 is a perspective of the sleeping platform of FIG. 6, shown fully extended;

FIG. 9 is a rear perspective of the open rear wall and top panel of the sleeping compartment container, showing mounting of hasp-type latches;

DETAILED DESCRIPTION OF THE ILLUSTRATED EMBODIMENTS

In this description, the term proximal is used to indicate the segment of the device closer to an operator. The term distal refers to an end away from the operator. The terms front, rear, side, top, and bottom bear the same directional meaning as like terms used for an associated vehicle. Where bolts are described as being used as connectors herein, rivets or other equally suitable fasteners may be used.

Figure 2:
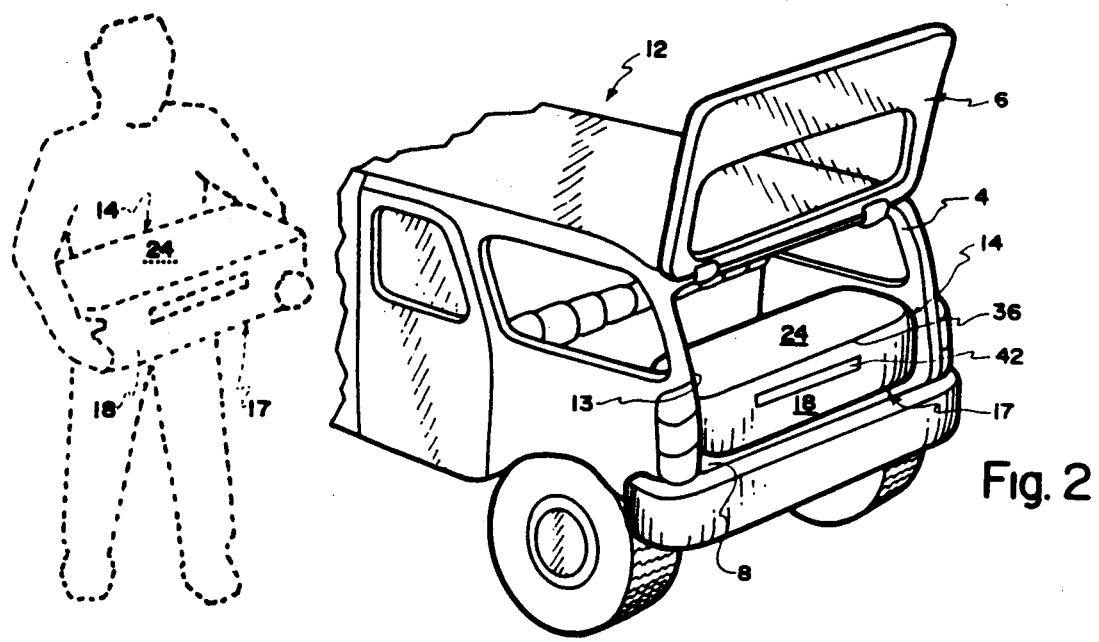
FIG. 2 is an exterior perspective view similar to FIG. 1 showing the same sleeping unit stored as luggage in the stored or closed position.
Figure 1:
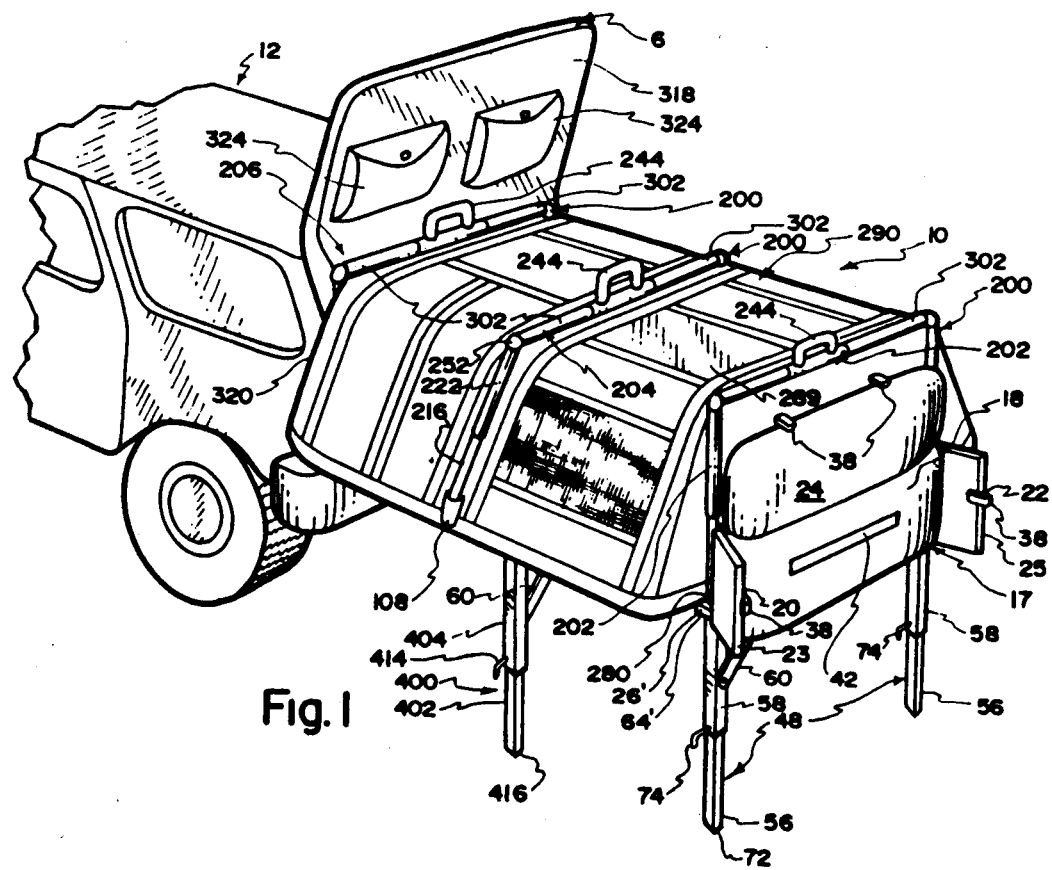
FIG. 1 is an exterior perspective view of a vehicle equipped with a presently preferred portable two person sleeping unit, in accordance with the present invention, shown in the as used or open position.

Reference is now made to the embodiments illustrated in FIGS. 1-14, wherein like numerals are used to designate like parts throughout. As seen in FIGS. 1 and 2, a presently preferred embodiment of the present invention illustrated as comprising an expandable and collapsible sleeping compartment 10 which is assembled and containerized substantially independent of the vehicle during non-use, as shown in FIG. 2, and is manually associated with and extended rearward from and beyond the vehicle 12 through a rear opening 13 thereof in a stable fashion for sleeping.

As seen in FIG. 2, sleeping compartment 10 is fully contained as if a parcel of luggage in a manually removable container or box 14. FIG. 2 illustrates the manual portability of the container 14 between a site remote from a place of intended use, shown in dotted line, and the site of intended use, shown in solid lines as being in the back of vehicle 12. Removable container 14 is preferably fabricated as a rigid housing of separable or partible components from fiberglass reinforced, rigid synthetic resinous material, or other material with suitable container qualities. In the presently preferred embodiment, container 14 can be divided into two parts and comprises a front wall 16, a rear wall 18, a top wall 24, two side walls 20 and 22, and a pair of raised bottom wall segments 26 and 26'. (See also FIGS. 3, 4, and 14.) The two side walls 20 and 22 can be separated from the front part 15 of the container 14 vertically near front wall 16. Side walls 20 and 22 are respectively hingeably connected to rear wall 18 by hinges 34 and 32, respectively. Hinge 32 is seen in FIGS. 6 and 7. Hinge 32 connects rear wall 18 to side wall 22 identically but of opposite hand to the connection between side wall 20 and rear wall 18 at hinge 34. The front container part 15 comprises front bottom panel 26 and front wall 16. Rear container part 17 comprises rear wall 18; rear bottom panel 26', top wall 24 and side walls 20 and 22. Container part 17 divides from container part 15 along edge surfaces 23 and 25 after latches 38 are released. Thus, the preset divisions of the bottom panels 26 and 26' and the front and side walls 20 and 22 allow container 14 to be separated into two parts 15 and 17, when side walls 20 and 22 are uncoupled from front wall 16 and top panel 24 is uncoupled from front wall 16 by latches 38 and oppositely relatively displaced. When opened, top panel 24 remains in one piece and is hingeably connected by hinge 36 to rear wall 18. See FIGS. 6 and 7.

Figure 9A:
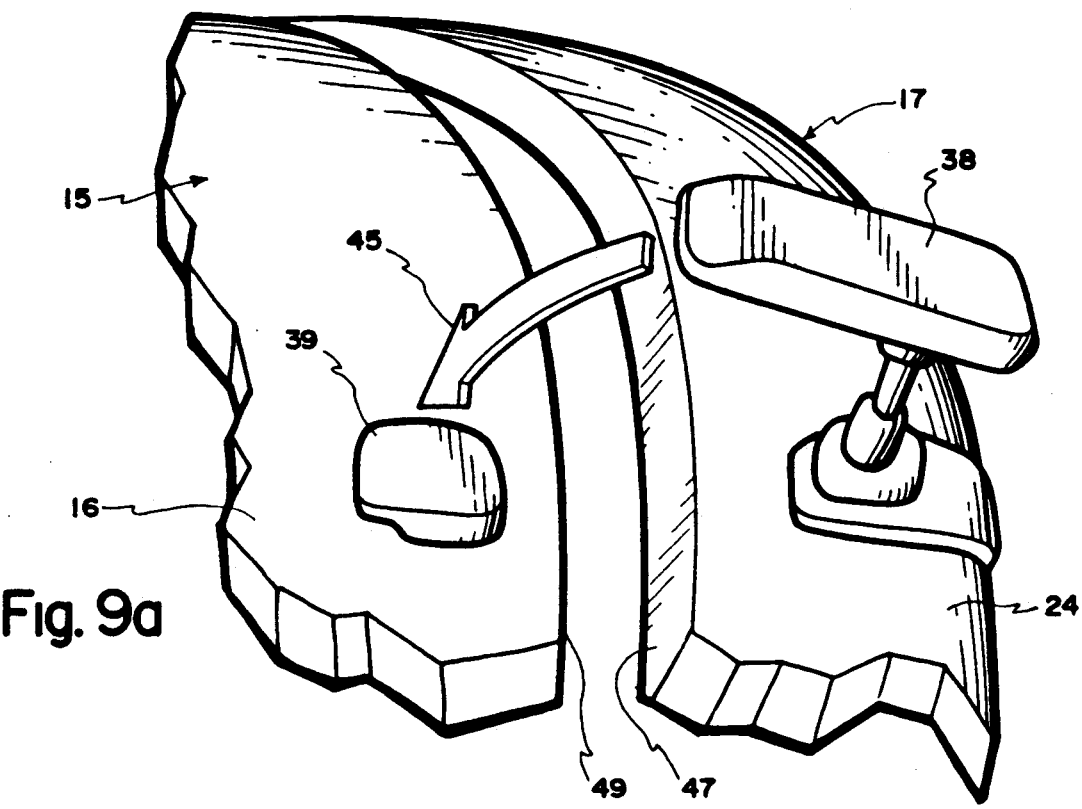
FIG. 9a is a fragmentary frontal perspective of the opened top panel shown in FIG. 9, depicting the hasp-type latch in greater detail.
Figure 9B:
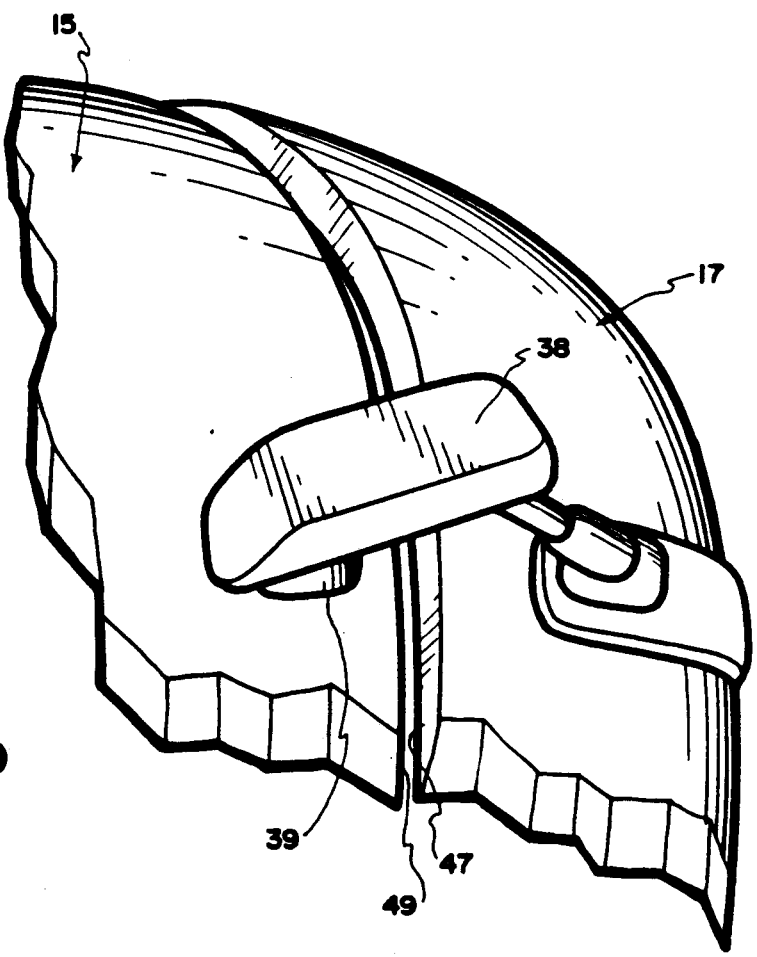
FIG. 9b is a fragmentary frontal perspective of the latch in FIG. 9a showing latch acquiring position.
Figure 9C:
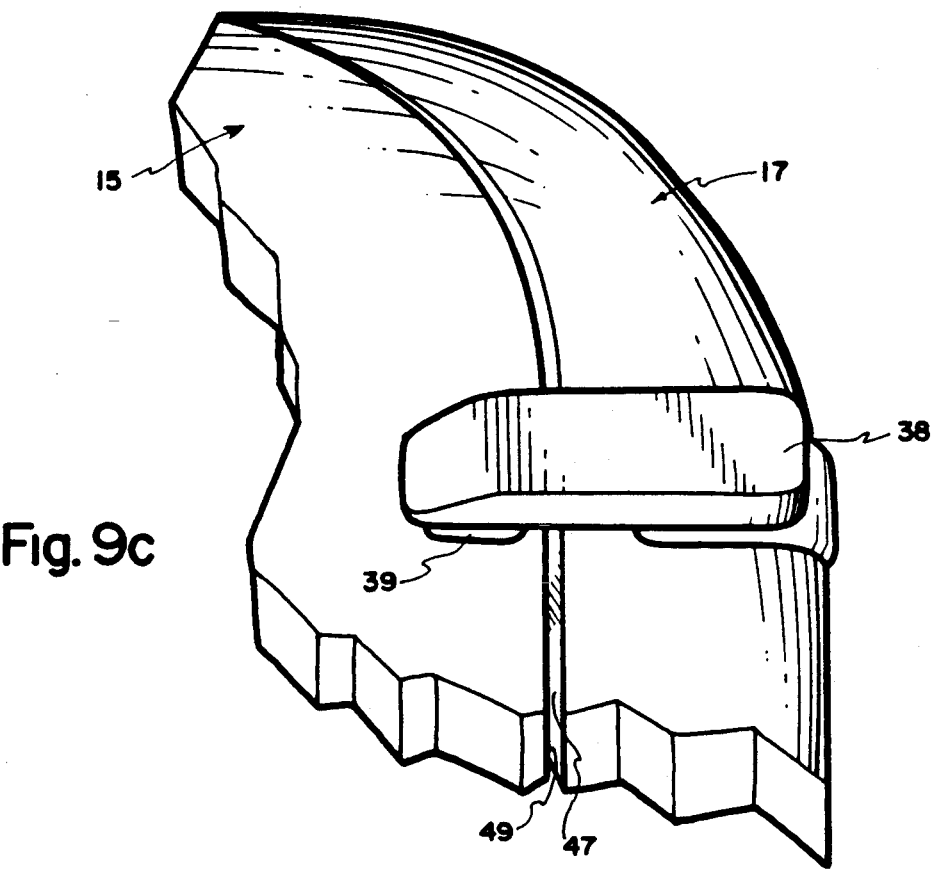
FIG. 9c is a fragmentary frontal perspective showing the latch of FIG. 9a in the closed or latched position.

Securing and closing container 14 may be accomplished by hasp-type latches 38, as seen in FIGS. 9 and 9a-9c. Top panel 24 is illustrated as carrying two latches 38 and side walls 20 and 22, each carry one latch 38. The latch on side wall 22 is not shown in FIG. 9, but is located in a similar, but opposite hand position as latch 38 on side wall 20. Each of the hasp-type latches 38 releasibly connect with a receiving connection 39 attached to front wall 16. See FIGS. 4, 9a, and 14. To secure and close container 14 for travel and removal from the vehicle, each hasp-type latch 38 is moved frontally, as indicated by arrow 45 in FIG. 9a, toward the associated receiving connection 39 on front panel 6 until the receiving connection is made, as seen in FIG. 9b, and each hasp-type latch 38 is closed, pulling the associated juxtaposed edges 47 and 49 together as seen in FIG. 9c. Front wall 16 and the top wall 24 and side walls 20 and 22 are thereby drawn together to join the parts 15 and 17 of container 14 into a closed luggage-like substantially manually portable pre assembled unit. Hasp type latches 38 are known and available in the art and, therefore, further description is not needed.

Figure 3:
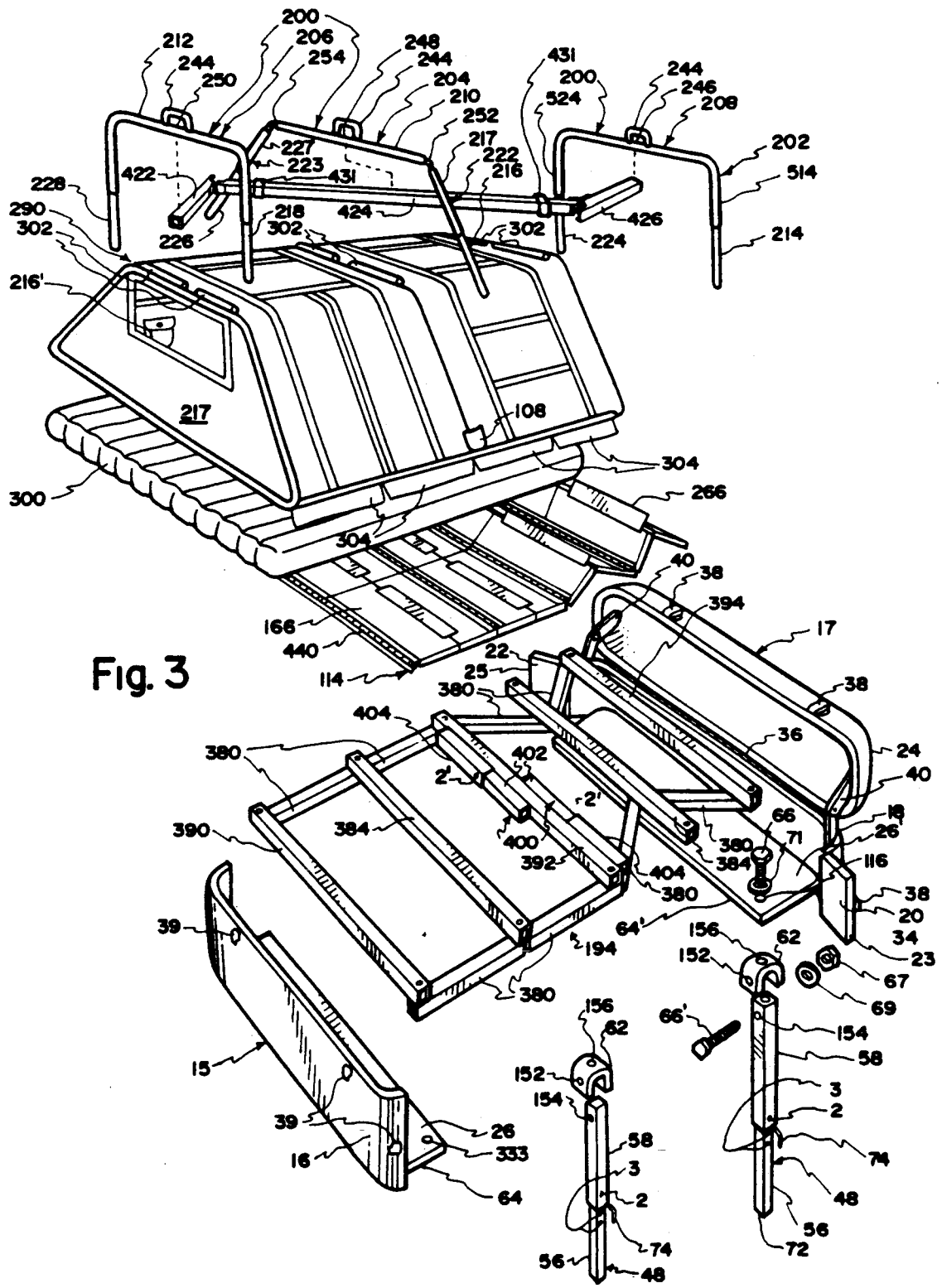
FIG. 3 is an exploded perspective view of the preferred sleeping unit of FIG. 1, showing component parts thereof.

As seen in FIGS. 1 and 3, container 14 bottom panel 26' is located slightly above the bottom edges of side walls 20 and 22, respectively, for reasons explained hereafter. When components of the container are opened, separated, or parted into parts 15 and 17, the hinged top panel 24 is swung upward and held in place vertically by top panel hinge supports 40. Viewed from the front, open top wall 24 comprises a planar top 82 and contiguous, forwardly distending sides 84, as seen in FIGS. 6 and 7. The bottom distending side 316 of top panel 24 is connected to the top-front side of rear wall 18 by a hinge 36. Hinge 36 is attached along edge 434 of member 316 such that top panel 24 swings rearwardly when opened. The other attaching side of hinge 36 attaches along edge 474 of the front side of rear wall 18. Inside each of the lateral distending sides 294 and 296 a a connection is made to a hinge support bracket 40 which is connected on an other end to the inside of a forwardly distending sides 284 and 286, respectively. Each hinge bracket comprises an upper bracket member 42 and lower bracket member 44 which are hingeably joined by a rivet or the like at union 46. When raised vertically, top wall 24 locks into place in a manner similar to locking a card table leg in vertical orientation to a horizontal card table top by a hinge connector 40. Such hinge connectors or supports are known in the art and are readily available. On the rear side of rear wall 18, a handle slot 42, which is used to extend compartment 14, is recessed for easy access during opening and closing of sleeping compartment 10.

Figure 5:
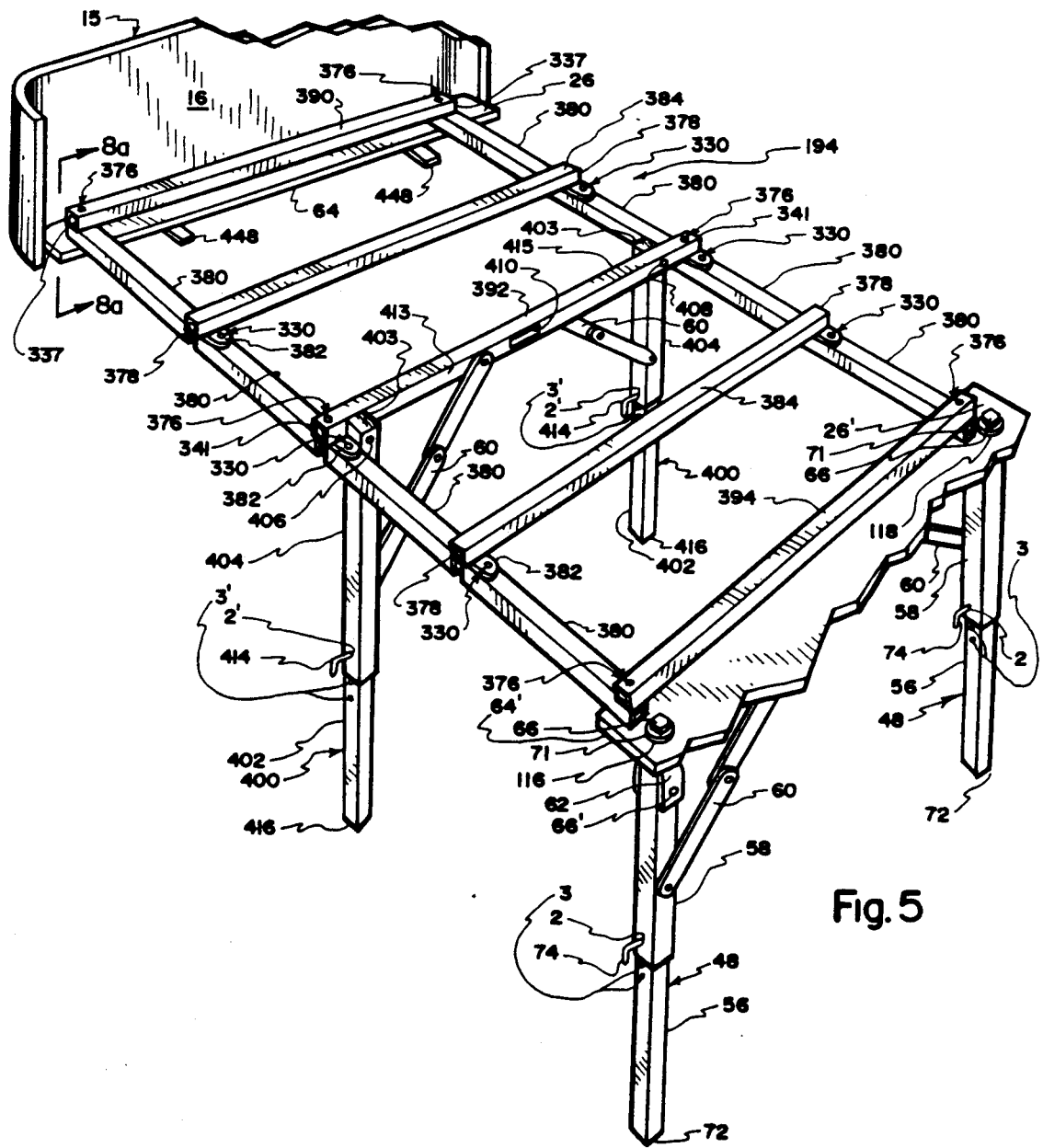
FIG. 5 is a perspective of the presently preferred compartment support frame of FIG. 4, fully extended with all legs oriented in vertical direction.

A folding support framework 194 for sleeping compartment 10 is shown in FIGS. 4 and 5, with some details shown in FIG. 8 and 8a–c. Frame 194 is generally horizontally disposed and comprises four pairs of folding support members 380, one front cross member 390, one rear cross member 394, one central cross member 392, and two slotted cross members 384. All cross members and folding support members are illustrated as being lengths of rectangular or square steel tubing, the cross members presently preferably being made of one inch square tubing and the folding support members presently preferably being made of three-forth by one and one-half inch rectangular tubing. Aligned holes drilled through opposite sides of overlapping support and cross members 390, 392, 394 and 380 receive a long bolt 376 or a short bolt 330, as explained hereafter, to accommodate extension and retraction of the assmebled framework 194.

Figure 8:
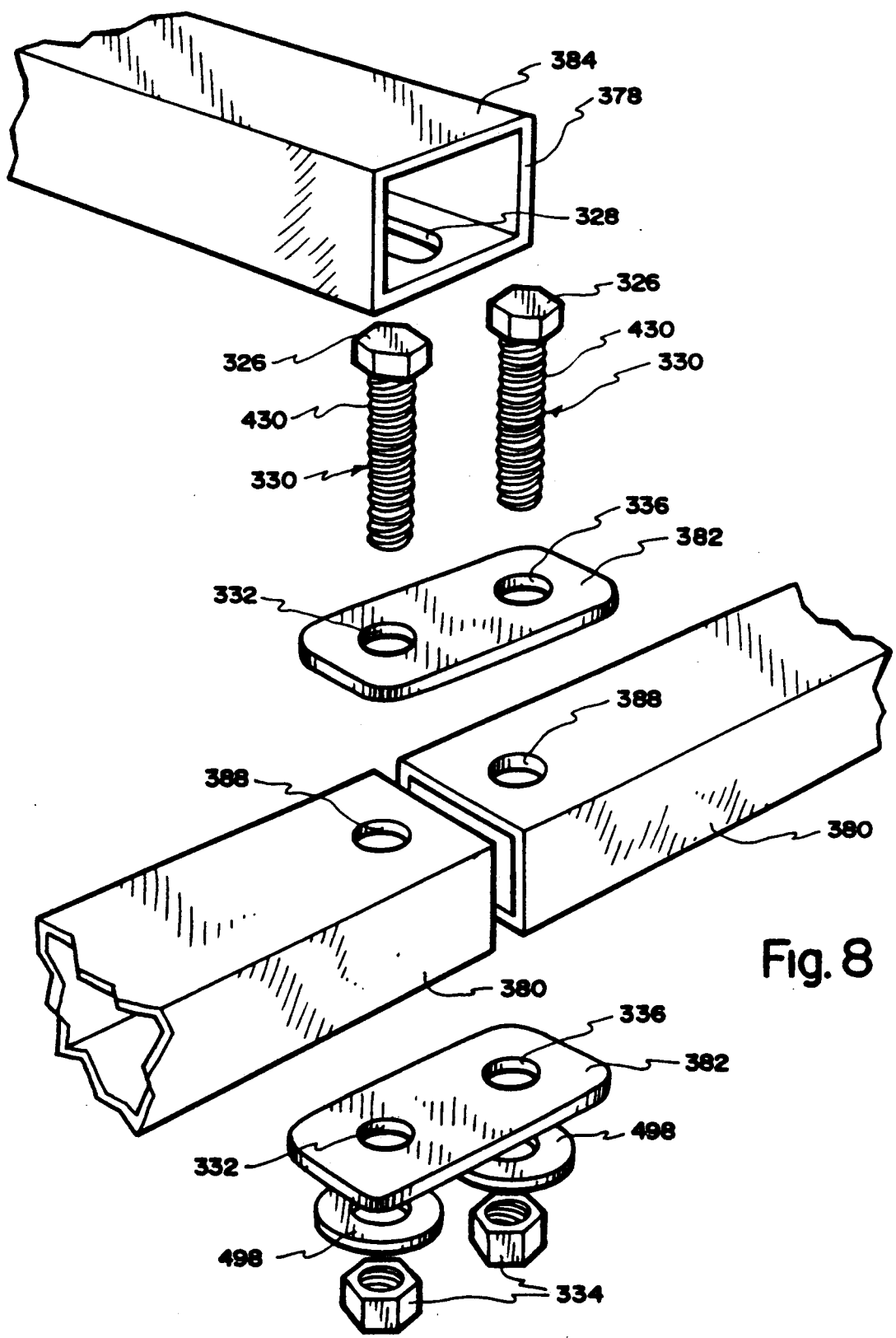
FIG. 8 is an enlarged exploded perspective of connecting assembly parts.

As best seen in FIG. 8, each folding support member 380 comprises a hole 388 near each end through which a short bolt 330 or a long bolt 376 passes. Folding support members 380 are joined together to comprise the two extensible sides of frame 194. To accomplish this, each folding support member 380 is joined to at least one other like member 380 by means of an upper and a lower connecting plate 382. (See FIG. 8.) Each connecting pate 382 comprises two identical holes 332 and 336. End-to end connection of each folding support member 380 is made by passing a bolt 330 through a first hole 332 of a top connection plate 382, through holes 388 of a first folding support member 380 and then through a first hole 332 of a bottom connection plate 382 whereafter a washer 498 and a locking nut 334 are applied to make a hingeable connection. To complete the end-to-end connection, another bolt 330 is advanced through a second hole 336 of the top connection plate 382, through holes 388 of the second folding support member 380 and then through a second hole 336 of the bottom connection plate 382 whereafter another washer 498 and locking nut 334 are affixed to make another hingeable connection. All of the end to-end connections between folding support member 380 parts are so made.

Figure 8A:
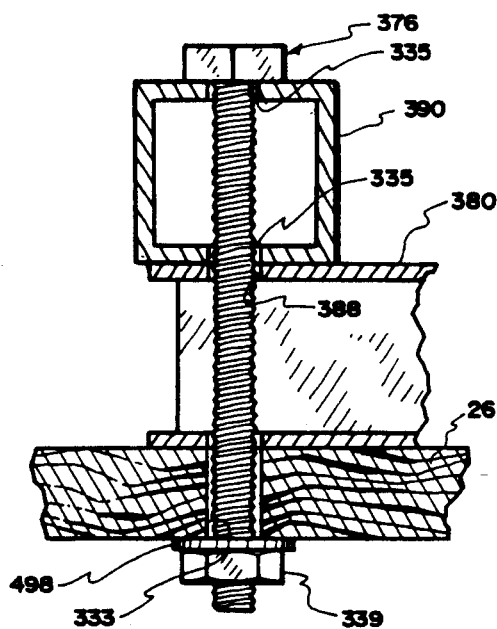
FIG. 8a is a fragmentary cross section showing connecting parts along line 8a—8a of FIG. 4.
Figure 8B:
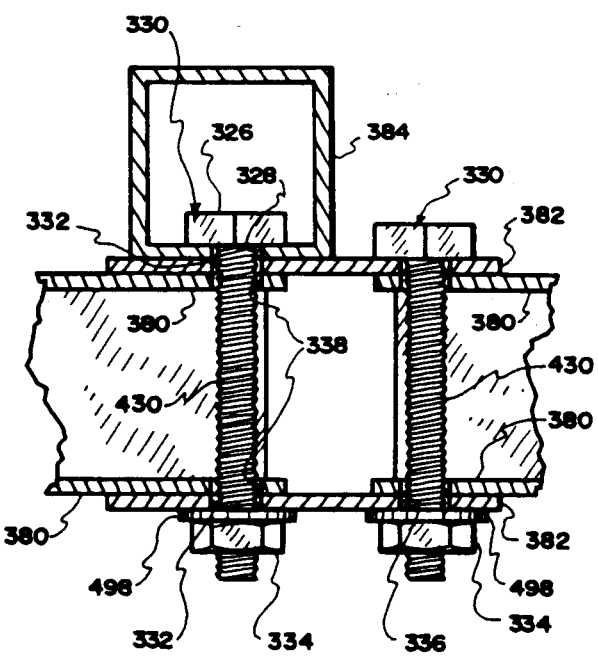
FIG. 8b is a fragmentary cross section showing connecting parts along line 8b—8b of FIG. 4.

As best seen in FIG. 8a, connection between front cross member 390 and an end of each open-ended length of connected folding support members 380 is made by passing a long bolt 376 through holes 335 near each end 337 of the front cross member 390, through a still free hole 388, and therefrom through a hole 333 in bottom panel 26 then adding a washer 498 and fastening bolt 376 with a self locking nut 339 to provide a hingeable connection. Each of the other ends of each open-ended length of connected folding support member 380 is similarly connected to rear cross member 394 and to bottom panel 26' to firmly affix the rear of frame 194 to the extending rear part 17.

Figure 8C:
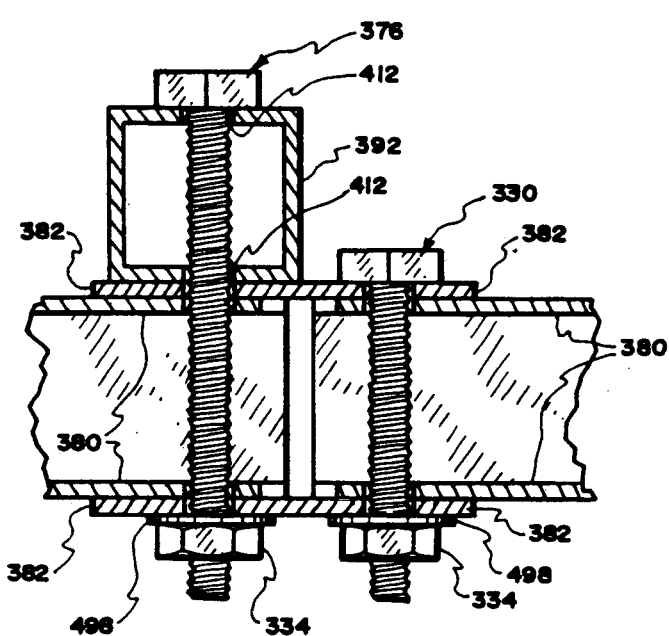
FIG. 8c is a fragmentary cross section showing connecting parts along line 8c—8c of FIG. 4.

As best seen in FIG. 8c, connection to each end 341 of middle cross member 392 is accomplished by replacing one of the short bolts 330 used to connect the middle-placed connection plates 382 to one of the associated folding support member 380 (in this case the most forward folding support member) with long bolt 376. In this case, long bolt 376 is passed, first through each hole 412 near the end 341 of middle cross member 392, then retracing the path of short bolt 330 through the other hinging parts of folding support members 380 as heretofore described. Such a connection is made between each 341 end of the middle cross member 392 and each associated extensible side of frame 194.

Each slotted cross member 384 comprises a longitudinal slot 328 along its bottom wall. See FIGS. 8 and 8b. Longitudinal slot 328 is wider than shaft 430 of short bolt 330 used to hingeably interconnect folding support members 380 such that shaft 430 travels along longitudinal slot 328 without binding when shaft 430 protrudes through longitudinal slot 328. Longitudinal slot 328 is sufficiently narrow that the head 326 of short bolt 330 protruding downward through longitudinal slot 328 remains inside slotted cross member 384. As shown in FIG. 8, longitudinal slot 328 extends medially from a position near end 378 of slotted cross member 384, whereby enough material is left at the end to provide a stop for a bolt 330 sliding outwardly along the slot, to a similar position at the opposite end of the slotted cross member. One of the bolts 330 (in this case each most forward bolt 330), in each of the hingeable joints which are not yet associated with a cross member, is inserted downward through slot 328 to a top connection plate 382 to be received by a first hole 332, two holes 388 in folding support member 380, a second hole 332, and affixed by a washer 498 and a lock nut 334 as heretofore described to assemble a slidable, hingeable connection. With bolts 330 so positioned in each slot 328, folding support members 380 slide outwardly in frame 194 to expand sleeping compartment 10 to its full length. In use, frame 194 unfolds in rectilinear translation like an accordion when the separated rear part 17 of container 14 is moved rearward and similarly folds when rear part 17 is moved toward the front of vehicle 12. A partly expanded frame 194 is seen in FIG. 4; a fully expanded frame 194 is seen in FIG. 5.

As seen in FIGS. 3–5, each of two rear support legs 48 comprises an upper receiving member 58 and lower telescoping member 56 provide rear support for sleeping compartment 10. Each upper receiving member 58 is preferably made from two inch squares rectangular steel tubing and comprises two juxtaposed drilled through holes 2 near the bottom of each member for a height adjustment pin 74 as best seen in FIG. 3. Each lower telescoping member 56 is sized to be telescopically received by associated upper receiving member 58 and comprises a series of vertically disposed drilled through holes 3 by which the level of the foot 72 of each lower receiving member 56 raised or lowered to conform to ground level is affixed in that position by inserting a pin 74 through juxtaposed holes 2 and 3 in members 58 and 56, respectively.

Frontwardly disposed from rear wall 18, each rear support leg 48 is hingeably attached to the underside 64' of bottom panel 26' as shown in FIGS. 3, 4, and 5. Each rear support leg 48 is attached to the bottom 64' of bottom wall support 26' by a U-shaped hinge bracket 62. As best seen in FIG. 3, each hinge bracket 62 comprises three holes. A first hole 156 is centered in the base of the "U" of bracket 62. The other two, commonly numbered 152, are centered and aligned in opposed orientation in the parallel sides of the "U". To attach a first hinge bracket 62 to bottom wall support 26', the bracket 62 is oriented such that the "U" is inverted and the sides are parallel with the rear cross member 394. The hole 156 is aligned with a hole of similar size in position 116 in bottom wall support 26'. A bolt 66 with a washer 71 is threaded therethrough and affixed with a nut (not shown). A second hinge bracket 62 is similarly attached to bottom wall support 26' at position 118, as shown in FIG. 5. Each rear support leg 48 comprises two aligned holes, commonly numbered 154, near the top of the upper telescoping member 58 and is hingeable attached to hinge bracket 62 by aligning holes 152 and 154 and inserting a bolt 66' therethrough and affixing thereat with a washer 69 and nut 67, shown only once in FIG. 3. The two support legs 48 are offset front-to rear from each other such that they fold transversely and horizontally into adjacent positions in the same plane under bottom panel 26' when sleeping compartment 10 is being stored or compacted.

A pair of adhesively applied magnetic strips (not shown) are applied to underside 64' of bottom panel 26' such that each magnetic strip is juxtaposed with an associated horizontally disposed support leg 48 to firmly hold each leg concealed under bottom panel 26' until manually released to swing into vertical orientation. When swung into vertical orientation, a hinge brace 60, similar to a heavy duty card table leg hinge, attached between bottom panel 26' and support leg 48 firmly, but releasibly, locks each support leg 48 vertically in position, as shown in FIGS. 4 and 5.

Two center support legs 400 comprising upper receiving member 404 and lower telescoping member 402 provide center support for sleeping compartment 10. Each upper receiving member 404 is preferably made from one inch square rectangular steel tubing and comprises two juxtaposed drilled through holes 2' near the bottom of each member 404 for a height adjustment pin 414, as shown in FIG. 5. Each lower telescoping member 402 is sized to be telescopically received by associated upper receiving member 404 and comprises a series of vertically disposed drilled through holes 3' by which he level of the foot 416 of each lower telescoping member 402 can be raised or lowered to conform to ground level and affixed in that position by inserting pin 414 through aligned and juxtaposed holes 2' and 3' in members 404 and 402, respectively.

Center support legs 400 are hingeably attached to middle cross member 392, one to front side 415 and one to rear side 413, as shown in FIGS. 4 and 5. Each center support leg 400 is attached by bolt 406 inserted through a pair of drilled through horizontal holes disposed in one end of middle cross member 392, and another pair of drilled through holes near the upper end 403 of the center support leg 400 and affixed with a nut 408 to provide a transverse hinge. The two center support legs 400 are offset front-to-rear from each other on opposite sides of cross member 392 such that they fold transversely and horizontally into the plane of frame 194. Two adhesively applied magnetic strips 410, one of which is shown in FIG. 5, are attached to the front and rear sides of cross member 392 juxtaposed with each leg 400 when in a folded or horizontal position to provide a magnetic latch which holds each leg in the plane of frame 194 for purposes of compacting and storing and until manually released while compartment 10 is open. When swung into vertical orientation, a latchable hinge brace 60, similar to a heavy duty card table leg hinge, attached between cross member 392 and support leg 400 firmly, bu releasibly, locks each support leg 400 into vertical position. The hinge position for each center support leg 400 is medial to the most outward position of folding support member 380 which is attached to middle cross member 392, but sufficiently close to the media edge of the associated folding support member 380, when fully outwardly extended, that support leg 400 with hinge brace 60 locked, provides a firm stop, restraining the extensible side of frame 194 in extended disposition until support leg 400 is manually retracted.

Connected to each separable part, 15 and 17, of container 14 is previously mentioned expandable frame 194 and, therewith also connected, platform 114, which is pre-assembled and folds into a double layered configuration when collapsed from the extended position of FIG. 7. See FIG. 6. Though the number may vary in other embodiments within the scope of this invention, currently preferred platform 114 comprises eight center support sections 166 which can be constructed of masonite, plywood, or other suitable rigid material, such as ALUCOBOND (Alucobond Technologies' aluminum sheeting with a plastic composite core). Each center support section 166 is joined to at least one other adjacent center support section 166 along a first longitudinal edge by continuous hinge 168 which is made of metal or other suitable hinge material. Except for forward center support section 167 and rearward center support section 165, along the second longitudinal edge is an aluminum strip 124 comprising flat aluminum stock which is attached longitudinally to only one of the two adjacent edges of center support sections 166 which do not comprise a metal hinge 168. Each aluminum strip 124 is attached such that a one half of the strip 124 overlaps the adjacent unattached edge when platform 114 is flat, providing support thereby. A strip 266 similar in construction and function to strip 124, more easily seen in FIGS. 3 and 6 is described in detail hereafter.

Front center panel 180 is attached to front cross member 390 in the frontmost part 30 of container 14 by a continuous metal hinge 440 as shown in FIG. 6. Rear center panel 182 is similarly attached to rear cross member 394 in the rear part 17 of container 14, but the hinge is not shown.

In the currently preferred model as shown in FIGS. 3 and 6–7, platform 114 comprises one side panel 170 attached to each shorter width end 184 of each center support section 166. Each side panel 170 is the same width as the adjoining center support section 166, but only half as long. Each side panel 170 is hinged to the adjoining center support section 166 with a metal or other suitable material hinge 441 such that each side panel 170 foldably opens outward to provide a platform of substantially twice the width of the length of associated center support section 166 or foldably closes inward for storage within container 14. Similar to each connecting hinge 168 of center support sections 166, each interior side panel 170 also comprises a hinge 443 to another side panel 170, but in opposite order of the hinges 168 of the center support sections 168 such that, when the side panels 170 are juxtaposed on top of the center support sections 166 to form a dougle layer, platform 114 rectilinearly folds accordion style. With hinges 443 so arranged between alternate center support sections 166, alternate side panels 170, and the shorter width ends 184 of each center support section 166 to a side panel 170, the entire platform 114 is hingeably connected together.

Similar to the unhinged longitudinal sides of the center support sections 166, one of each of the two adjacent unhinged sides 171 of side panels 170 has attached a long thin piece of flat stock aluminum 266 bonded lengthwise. See FIG. 6. Each flat stock aluminum piece 266 is mounted so that half attaches to a side panel 170 and the other half extends outward to provide support of an adjacent unfolded side panel 170 when platform 114 is flat. In this preferred embodiment, cross members 384, 390, 392, and 394 are of equal length and are longer than center support sections 166 such that they provide at least partial underlying support for side panels 170 when extended. In one currently preferred embodiment, the length of each cross member is 44 inches, which fits lengthwise into container 14. In this same embodiment, the length of each center support section 166 is approximately 29.5 inches which provides for a bed with of 59 inches and an outwardly extending support of over 7 inches by cross members underneath the unfolded side panels. The scope of the invention comprises other sleeping compartment 10 dimensions consistent with storage and access dimensions of various models of rear opening vehicles 12.

An air mattress 300 is disposed on the top of platform 114 and may be attached by hook and loop strip attachment to platform 114 Air mattress 300 is shown unfolded and inflated in FIG. 3. When air mattress 300 is deflated, it folds with platform 114 to be stored in container 14.

Referring to FIGS. 1 and 3, attached to the top side of bottom panels 26 and 26' at the front and rear of sleeping compartment 10, are canopy poles 206 and 202, respectively. Canopy poles are generally designated 200. Similar to support legs 48, canopy poles 200 telescope. The telescoping sections of front and rear canopy polés 200, comprise rear lower canopy poles 214 and 224 and front lower canopy poles 218 and 228. Each of the lower canopy poles are attached to the top side of the bottom panels 26 and 26', respectively, by a metal collar 280. Thus, rear canopy poles 214 and 224 attach to bottom panel 26', while front canopy poles 218 and 228 attach to front bottom panel 26. A rear top member 208 comprises an upside down "U" shaped section of tubing comprising ends 514 and 524 telescopically fit over each rear lower pair of smaller rear lower canopy poles 214 and 224, respectively, to form rear canopy pole 202. Similarly, a top front member 212 is "U" shaped and telescopically joined to front bottom canopy poles 218 and 228 to form front canopy pole 206. Each distending leg of each "U" shaped top canopy pole members (208 and 212) comprises a linear set of spaced holes 2', similar to those shown in partial pole 56' in FIG. 3b. Each lower canopy pole (214, 224, 218, and 228) comprises a spring pin 54 similar the one shown for lower segment 50 in FIG. 3b, which allows each canopy pole to releasibly telescope upward or downward and lock into place along a receiving telescoping member such as member 56' in FIG. 3b. At the top center of each front canopy pole 206 and each rear canopy pole 202 are handle positions 250 and 246, respectively. A handle 244, attached to each handle position, 250 and 246, is used to vertically extend the front and rear canopy poles.

A center canopy pole 204 is different from front and rear canopy poles, 206 and 202. Center canopy pole 204 is hinged at two hinge positions 252 and 254 such that two upper downwardly distending legs, 222 and 223, swing outwardly. Each distending leg, 222 and 223, comprises joined telescopic members, 216 and 217 and 226 and 227, respectively.

An example of hinge apparatus 256 is shown in FIG. 3a, as used in association with hinge position 252. The hinge apparatus for hinge position 254 is similar to that shown for hinge position 252, but of opposite hand. Elbow extension 258 is firmly affixed to top canopy pole 210, extends outward and downward, and is welded or otherwise firmly affixed to flat hinge plate 260. Flat hinge plate 260 comprises a hole 261 therethrough for a hinge pin 262. Near the top of upper leg member 217, two juxtaposed holes 263 formed therethrough are of a diameter which provide a press-fit for hinge pin 262. Holes 263 and 261 are placed in juxtaposed relation and hinge pin is forced therethrough to hingeably tie center top canopy pole 210 to upper side canopy pole 222.

Each lower telescopic member, 216 and 226, engages a cloth collar 108 formed as a pocket in the canopy 290 of sleeping compartment 10 which is described in detail later. Only the proximal cloth collar 108 is shown in FIGS. 1 and 3. Details of one side of the hingeable telescopic construction of center canopy pole 204 is seen in FIG. 3a. As shown by example, each side comprises a lateral extension of a central top pole 210, a hinge apparatus 256 and the telescopically joined distending leg 222. The connecting parts on the other side of center canopy pole 204 are identical, but of opposite hand. Each lower telescopic member described in this example comprises a spring pin 54 and each higher telescopic member so described comprises a linear set of corresponding holes 2" which allow the central canopy pole to releasibly telescope upward and lock into place in a manner similar to that shown in FIG. 3b.

At the top of central canopy pole 210 is a handle position 248 to which is attached a handle 244 which is used to vertically extend central canopy pole 204. Cloth collar 108 is formed by turning up a portion of canopy bottom edge 304 of canopy 290 (which is discussed in more detail later) and sewn to form the pocket or cloth collar 108 into which the outwardly and downwardly distending legs insert to apply tension to the center of the canopy as center canopy pole 204 is telescopically extended upward.

Thus, when center canopy pole 204 is in place in the sleeping compartment open position, center canopy pole 204 is in the form of a upside down "U" which is broader at the open portion of the "U" than at the closed portion. Center lower canopy poles 216 and 226 are disassembled from cloth collars 108 as part of the compacting of sleeping compartment 10.

Canopy 290 is preferably formed of canvas or like sheet material, which can be collapsed as the described frame is collapsed into a folded arrangement within the container 10 and attaches in pre-assembled form to canopy poles 200 by a series of superiorly placed loops 302 place at the front, rear, and center of canopy 290. Each loop 302 wraps around a canopy pole as shown in FIGS. 1 and 3. Canopy bottom edges 304, seen in FIG. 3, wrap around and attach by hook and loop material to the bottom side of side panels 170 on platform 114. The loop material of canopy 290 is not seen on the underside of canopy edges 304 in FIG. 3, but strips of hook material 169 is seen disposed along medially folded edges of side panels 170 in FIG. 6.

Figure 14:
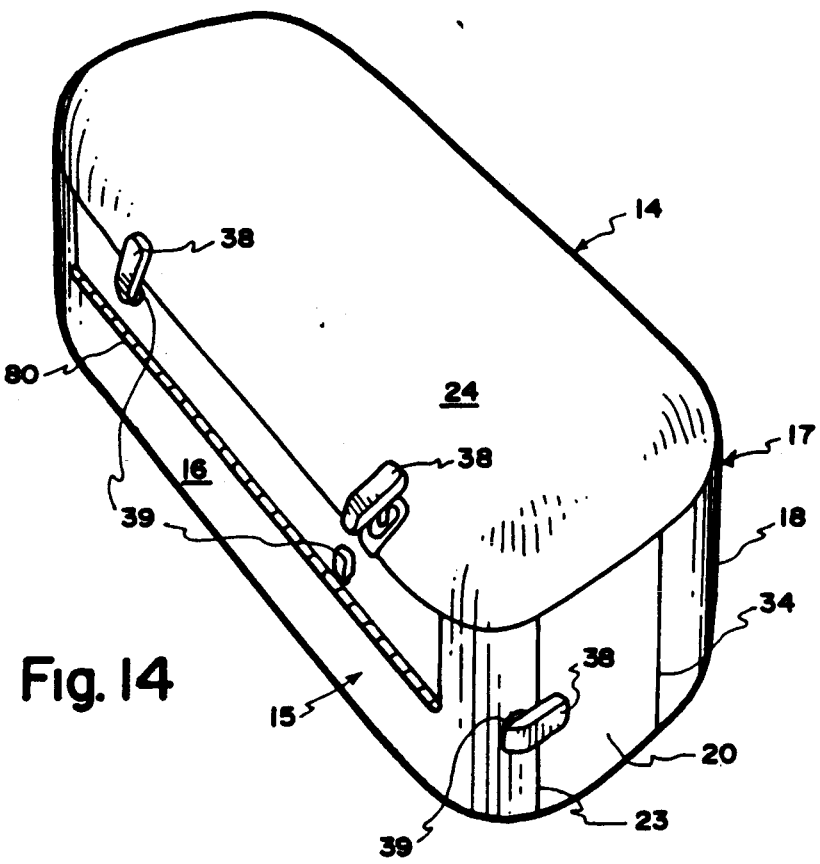
FIG. 14 is a frontal perspective of a closed and partially latched sleeping unit.

Additional longitudinal support for top of canopy 290 is provided by a canopy top brace 420 which unfolds and folds in a manner similar to folding support frame 194. As seen in FIG. 14, canopy top brace 420 comprises three parts, canopy rear top brace 426, canopy center top brace 424, and canopy front top brace 422, each of which is shown schematically to be hingeably connected to the center of rear canopy pole 202, of center canopy pole 204, and of front canopy pole 206, respectively. Each of the parts of canopy top brace 420 is preferably made from 1 inch square steel tubing although other plastic or metal supporting material could be used within the scope of the invention. Connections between the parts of top brace 420 and canopy poles 200 are made through canopy 290, however canopy 290, handles 244, and other parts of canopy poles 200 are not shown in FIG. 13 for clarity of presentation.

Figure 13:
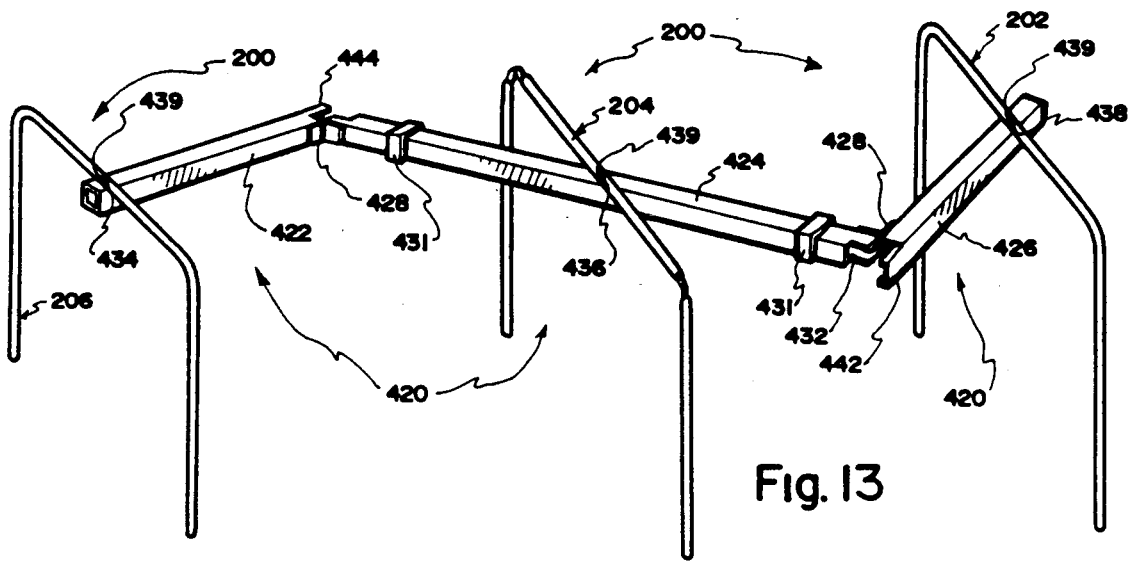
FIG. 13 is a fragmentary perspective of the sleeping compartment's canopy poles and a foldable top brace attached to the center of each pole, the normally encasing canopy being removed for clarity of illustration.
Figure 13A:
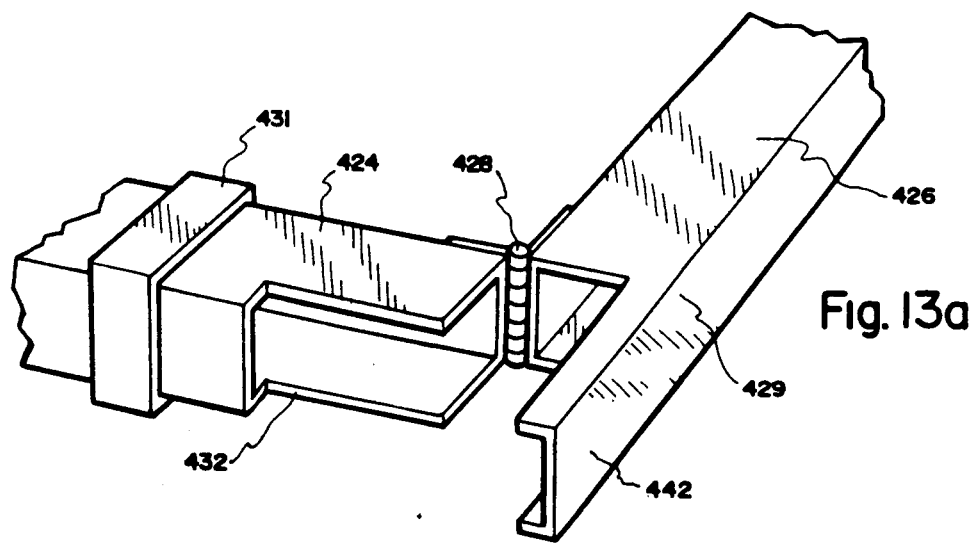
FIG. 13a is an enlarged fragmentary perspective of one hinged section of the top brace of FIG. 13, shown in its open, pivoted position.
Figure 13B:
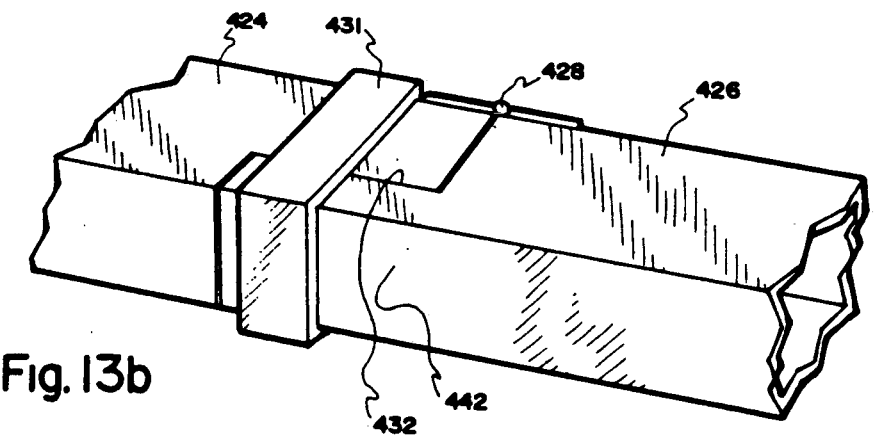
FIG. 13b is an enlarged fragmentary perspective of the hinged section of FIG. 13, shown in its completely unfolded, linear and locked position.

Canopy rear top brace 426 connects to rear canopy pole 202 by means of a bolt 439 passing first through a hole in rear canopy pole 202 at center connection point 438 and through a hole near the rear end of canopy rear top brace 426 and is affixed as a hinge by a lock nut. At the frontal end of canopy rear top brace 426, a hinge 428 is attached to hingeably couple rear canopy top brace 426 to canopy center top brace 424 as shown in FIGS. 13 and 13a-b. Extending outward beyond the line of connection 429 of hinge 428 to rear canopy top brace 426 is a U-shaped tongue 442, as is best seen in FIG. 13a. Canopy center top brace 424 comprises a slot 432 which is sized and positioned to foldably accept U-shaped tongue 442 when the brace is fully extended. Canopy center top brace 424 comprises two loose fitting rings 431 which are free to slide the length of the brace. When canopy top brace 420 is fully extended and U-shaped tongue 442 is positioned in slot 432, as shown in FIG. 13b, a ring 431 is slipped over U-shaped tongue 442 to lock the rear portion of canopy top brace 420 in the extended position.

Canopy center top brace 424 is medially connected to center canopy pole 204 by passing a bolt 439 through apertures in the center of each canopy pole 204 and center top brace 424 at connection point 436 and affixing a hingeable connection with a lock nut. Connection between canopy center top brace 424 and canopy front top brace 422 is identical to the connection between canopy center top brace 424 and canopy rear top brace 426, but of opposite hand whereat a U-shaped tongue 444 is accepted by a slot (not shown) when canopy top brace 420 is fully extended. Canopy front top brace 422 is connected to front canopy pole 206 at point 434 by a bolt 439 and lock nut similar to the connection of rear canopy 202 to rear top brace 426, already described. To lock canopy top brace at the forward hinge 428 position, the forward ring 431 is slipped over U-shaped tongue 444. To release the canopy top brace 420 to fold for compacting and storing, rings 431 are slid away from U-shaped tongues 444 and 442 and top brace 420 is released to fold as the relative distance between canopy poles 200 is reduced.

Figure 11:
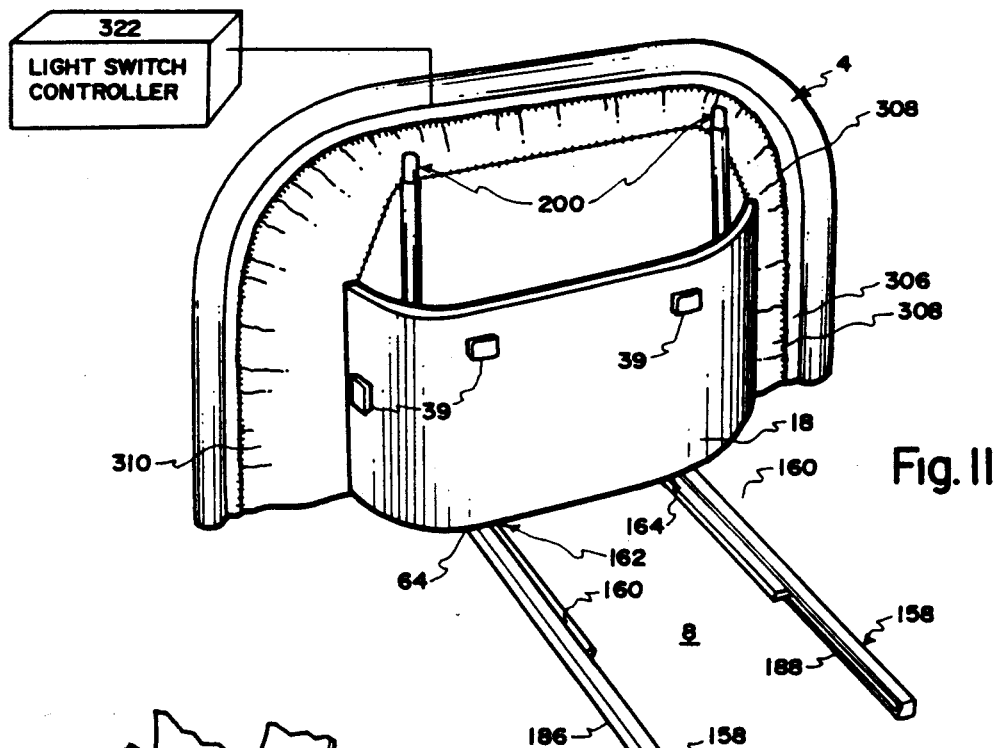
FIG. 11 is a rear perspective from inside a rear opening vehicle showing a dust and weather proofing flap, closed by hook and loop strips, as well as the front of a sleeping compartment container fully positioned rearward in an open orientation.
Figure 10:
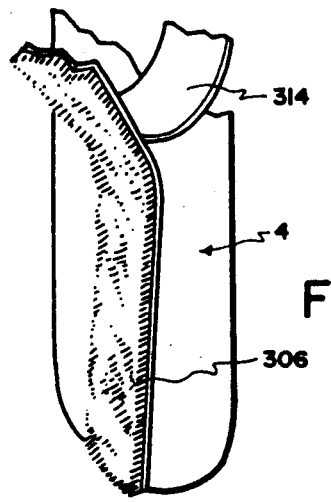
FIG. 10 is an enlarged fragmentary perspective showing hook or loop strip by which a dust flap of the compartment of FIG. 1 is attached to a vehicle door jam.

FIG. 11 is a perspective view of a rear interior of vehicle 12 showing a currently preferred embodiment of a vehicle dust and weather proofing flap 310 enclosing the open rear of vehicle 12. Front end 310 of canopy 290 comprises vehicle attachment flap 310, as seen in FIG. 11, which provides a canopy hook material strip 308 which correspondingly matches a vehicle loop material strip 306 concealed on the inside door jam 4 of vehicle 12. Hook and loop material so used in this invention is well known and available in the art. Vehicle loop material strip 306 is permanently mounted to vehicle 12 where it is unseen when sleeping compartment 10 is not attached and the rear doors of vehicle 12 are closed. An exemplary method of attachment of loop material strip 306 to vehicle door jam 4 is shown in FIG. 10 wherein removable strip 314 which protects the adhesive of the attachable portion of vehicle loop material strip 306 is shown partially removed as vehicle loop strip 306 is being affixed to door jam 4. To completely close and weatherproof the rear access opening of vehicle 12, the loop 306 and hook 308 strips are compressibly fastened together along door jam 4 as shown in FIG. 11. The loop 306 and hook 308 fasteners are detached when access to the sleeping compartment 10 from the vehicle is desired.

In accord with the invention, canopy 290 can comprise any number of variations in placement, size, and configuration of windows and doors. For example, canopy 290 may have a window in the form of a skylight 289 FIG. 1 in the top. Other canopy embodiments comprise side entrance doors which provide sleeping compartment 10 accessibility directly from outside vehicle 12 and a canvas panel 217 (FIG. 3 which separates the interior of vehicle 12 from the interior of canopy 290, while providing heat transfer from vehicle 12 to canopy 290 through an interior vehicle-to-sleeping compartment access opening 216' (FIG. 3). Another preferred embodiment comprises a canopy with only windows disposed on canopy 290 exterior with no panel between vehicle 12 and sleeping compartment 10 whereby entrance into sleeping compartment 10 is only through vehicle 12. Pockets 216 are attached to the inner surface of canopy 290 for convenient storage of personal and camping items.

For the care of an opened rear vehicle door 6 when sleeping compartment 10 is open, optional door covers 318 provide environmental protection as seen in FIG. 1. Optional door covers 318 can be made from the same material used for the canopy or from less expensive clear vinyl. Door cover 318 slips over the open door 6 of vehicle 12 so that door 6 will be weather and dust proofed. As shown in FIG. 1, optional door cover 318 also contain areas for large pockets 324 for storage.

Two glide rails 160 are attached at sites 162 and 164 on underside 64 of bottom panel 26, for anchoring container 14 for safe opening as depicted in FIG. 11. Corresponding vehicle stationary rail attachment sites 186 and 188 are located on the vehicle bed 8 centered near the rear opening of vehicle 12. Stationary rail attachment sites 186 and 188 are positioned in alignment with and juxtaposed a position where container 14 glide rail attachment sites 162 and 164 reside when container 14 is placed thereon. One glide rail 160 is permanently affixed to each attachment site 162 and 164 and one stationary rail 158 is attached to each vehicle stationary rail attachment site 186 and 188 such that when container 14, with the pre-assembled, collapsed sleeping compartment 10 disposed therein, is manually loaded into vehicle 12 each glide rail 160 is readily received by an adjacent stationary rail 158. Each stationary rail 158 comprises two end stops, one which positions container 14 for transport and one which positions container 14 in a most rearward position when sleeping compartment 10 is open for use. The forward position for travel allows container 14 to slide forward to be totally contained inside vehicle 12. The rearward position allows the self-contained pre-assembled sleeping compartment 10 to be safely stopped from further rearward travel and there supported by vehicle 12. In the most rearward position, access to vehicle 12 is enhanced when sleeping compartment 10 is rectilinearly open. Such glide rails are known and readily available in the art and are, therefore, not treated further herein.

Figure 12:
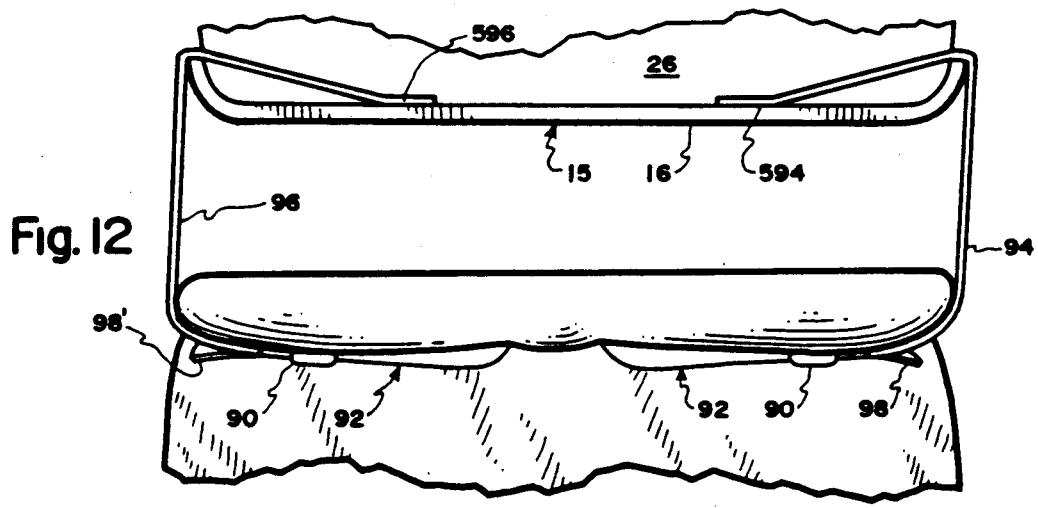
FIG. 12 is an overhead perspective, with parts removed for clarity, of the luggage carrying compartment and back seat of a vehicle showing the rear member of an opened end parted sleeping compartment container anchored by attachment to the vehicle's seat belts.

Another embodiment for anchoring compartment 14 in the back of a vehicle 12 for rearward expansion is seen in FIG. 12. This embodiment comprises two belts 94 and 96, each comprising a tab 90 which is insertably connects to a seat belt and buckle, generally designated 92. Each belt, 94 or 96, is length adjustable by connecting tab 90 to buckle 92 and tightening the belt by pulling on an associated strap, 98 or 98', respectively. Once tightened, the each belt, 94 or 96, remains taut until buckle 92 is released. When container 14 is opened for separating container 14 into its two parts, belts 94 and 96 and associated connection tabs 90, having been released from storage in container 14, are thereafter available for connection to the vehicle's seat belts to anchor the container at the rear of vehicle 12 such that when rear well 18 is pulled rearward, front part 15 is left stationary. A secure, drawn taut attachment of one belt 96 affixing front part 15 to seat belts 92 is best seen in FIG. 12. Belts 94 and 96 are firmly affixed by a series of rivets or the like to the rear of front wall 16 at connecting points 594 and 596, respectively.

Opening sleeping compartment 10 for use is easily performed. As shown in FIG. 1, rear vehicle door 6 is opened to reveal the closed, manually portable container 14 in which all of the previously described self-contained and pre-assembled sleeping components are stored in a rectilinearly collapsed condition. Prior to the time of use, the loaded container 14 can be manually retrieved from storage outside vehicle 12 and manually placed into vehicle bed 8 for travel. First step in placing the sleeping compartment 10 in its ready for use position comprises manually grasping container 14 by recessed handle 42 in rear wall 18 and manually pulling container 14 rearward to its rearmost position preparatory to opening sleeping compartment 10.

Once positioned at the rear of vehicle 12, latches 38 are manually detached such that components of the container 14 are free to open, separate or part from each other. Front part of container 14 is securely anchored to the rear of vehicle 12, for example, by extension to the rearmost position of stationary rails 158 or by taut attachment of belts 94 and 96 to the vehicles rear seat belt buckles 92. Recessed handle 42 is grasped and pulled rearward to part container components. Specifically, top panel 24 is opened rearward and upward to a locked and upright or vertical position supported on each side by a top panel hinge support 40. The rear part 17 of container 14 is pulled horizontally rearward in rectilinearly translation a short distance such that rear support legs 48 clear vehicle 12 where they are hingeably released to vertical orientation under sleeping compartment 10. With each support leg 48 telescopically extended and locked vertically by hinge brace 60 to provide nominal support, rear part 17 of container 14 is fully extended. Center support legs 400 are manually swung to vertical orientation and telescopically distended to provide level support for platform 114. Associated hinge braces 60 are locked. Then rear support legs 48 are fully extended to provide leveling support at the rear of platform 114. Side walls 20 and 22 are swung outward to allow space for hinged side panels 170 to be freely unfolded. Hinged side panels 170 are folded outward providing space for a two-person platform 114.

Center canopy pole 204 is inserted into cloth supporting collars 108 from the top side. Each of canopy poles 200 is extended until canopy 290 resists further upward extension and a spring pin 54 of each leg of each top canopy pole is engaged in a hole in a bottom canopy pole providing support for canopy 290 through loops 302. Once upwardly extended, the canopy 290 is drawn taut front-to-back by rotating canopy top brace 420 such that each U-shaped tongue 444 and 442 is engageable by a ring 431. Vehicle attachment flap 310 is releasibly attached to door jam 4 of vehicle 12 to provide a dust and weather proofing cover as earlier described. To close or compact the unit, this opening process is reversed. As front part 15 is joined with rear container part 17, two guide supports 448, attached to underside 64 of bottom panel 26 as shown in FIG. 5 provide guiding support for rear container part 17 prior to engaging receiving connections 39 with associated latches 38.

Another preferred embodiment comprises entrance to compartment 14 only from within vehicle 12. In this embodiment, container 14, as shown in FIG. 14, is provided with a continuously hinged opening which extends across the width of front wall 16. Continuous hinge 80, disposed above the bottom wall support 26, allows for the thickness of an inflated air mattress 300, yet provide for the opening section of front wall 16 to drop from a vertical position to form a ramp with vehicle bed 8 forward of container 14.

To preserve vehicle 12 battery power, a rear light switch controller 322 is provided to switch off vehicle 12 lights which are normally turned on when rear vehicle door 6 is opened as shown diagrammatically in FIG. 11. Such controllers are known and readily available in the art.

Other embodiments provide single sized units. For example elimination of side panels 170 reduces the width of sleeping compartment 10 to a single sized unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A manually portable temporary shelter comprising expandable/collapsible sleeping compartment structure comprising a collapsible/extendable canopy covering having weight and by which an interior sleeping space is defined by top and side wall means of the canopy covering and collapsible/extendable support structure comprising means connected to the canopy covering so that the support structure and the canopy covering extend and collapse together in a rectilinear fashion, the support structure comprising means by which the weight of the canopy covering and any person occuyping the sleeping space is transferred with no more than inconsequential deflection to the extended support structure;

the temporary shelter further comprising a hand-held openable container comprising an interior and means associating the sleeping compartment structure with the interior of the container whereby the canopy covering and the support structure are unitarily extended entirely from within and collapsed entirely into the container and the container with the unitarily collapsed canopy covering and the support structure toted manually from place to place including independently manually into and from a vehicle.

2. A manually portable temporary shelter according to claim 1 wherein the support structure comprises extendable/collapsible column supports which when extended engage terrain so that the extended support structure exclusive of the column supports is disposed above the terrain.

3. A manually portable temporary shelter according to claim 2 wherein the column supports comprise adjustable telescopic extendable/collapsible means by which the sleeping space can be made to be horizontal, independent of variations in the terrain.

4. A manually portable temporary shelter according to claim 1 wherein the container comprises exteriorly exposed manual handle means for manually toting the container with the collapsed canopy covering and support structure therein and latch means for locking and unlocking the container.

5. A manually portable temporary shelter according to claim 1 further comprising means by which an end of the sleeping compartment structure is temporarily connected to the vehicle at an opening therein.

6. A manually portable temporary shelter according to claim 1 wherein the support structure comprises extendable/collapsible platform means which when rectilinearly extended are disposed along a bottom of the sleeping compartment structure.

7. A manually portable temporary shelter according to claim 6 wherein the platform means comprise foldable segments which extend and collapse in an accordion-like fashion.

8. A manually portable temporary shelter according to claim 7 wherein the platform means further comprise segments and interconnecting means therebetween accommodating bi-directional folding into and from a multiple layered stacked relation.

9. A manually portable temporary shelter according to claim 1 wherein the means associating the sleeping compartment structure comprise components which can be selectively manually separated from each other for relative rectilinear translation and extended disposition at opposed ends of the sleeping compartment structure.

10. A manually portable temporary shelter according to claim 9 wherein the components comprise means for temporary connection to and disconnection from the vehicle adjacent an opening thereof.

11. A manually portable temporary shelter according to claim 1 wherein the canopy covering and the support structure when extended define access opening means by which at least one person enters and exits the sleeping space.

12. A manually portable temporary shelter according to claim 1 wherein the canopy covering and the support structure when extended define access opening means by which at least one person enters and exits from the vehicle.

13. A manually portable temporary shelter according to claim 1 wherein the canopy covering comprises window means.

14. A manually portable temporary shelter according to claim 13 wherein the window means comprises skylight means.

15. A manually portable temporary shelter according to claim 1 wherein the canopy covering comprises a collapsible sheet material.

16. A manually portable temporary shelter according to claim 1 further comprising superstructure which extends upwardly and engages and holds the canopy covering erect and taut when the canopy covering is extended to define the sleeping space.

17. A manually portable temporary shelter according to claim 1 wherein one end of the canopy covering comprise means releasibly connectable to the vehicle at an opening therein and selectively openable/closeable closure means, the closure means spanning across said opening when closed.

18. A temporary shelter comprising a manually transportable container and expandable/collapsible sleeping compartment structure comprising a collapsible/extendable tent-like canopy covering joined to collapsible/extendable support structure including collapsible/extendable platform means, the canopy covering and the support structure being unitarily manually extendable from entirely within the container through an opening in a vehicle and manually collapsible entirely into said container, said temporary shelter further comprising:

manually portable luggage-like exterior casing means comprising external handling means for manually carrying the container and the unitarily collapsed canopy covering and support structure therein from place to place and means by which the container is caused to be open for unitarily extending the canopy covering and the support structure to create a full-length externally enclosed sleeping space; and means releasibly affixing the sleeping compartment structure to the vehicle adjacent said opening prior to extension and use;

the releasibly affixing means comprising means compatibly connecting with vehicle seat belt straps and buckles and which, when connected and shortened to provide taut restraint, limit rearward movement of the sleeping compartment structure.

19. A temporary shelter comprising a manually transportable container and expandable/collapsible sleeping compartment structure comprising a collapsible/extendable tent-like canopy covering joined to collapsible/extendable support structure including collapsible/extendable platform means, the canopy covering and the support structure being unitarily manually extendable from entirely within the container through an opening in a vehicle and manually unilaterally collapsible entirely into said container, said temporary shelter further comprising:

manually portable luggage-like exterior casing means comprising external handle means for manually carrying the container and the unitarily collapsed canopy covering and support structure therein from place to place and means by which the container is caused to be open for facilely unitarily extending the canopy covering and support structure to create a full-length externally enclosed sleeping space; and means releasibly affixing the sleeping compartment structure to the vehicle adjacent said opening prior to extension and use;

the sleeping compartment structure further comprising selectively openable and closeable closure means which, when closed, extend across the opening in the vehicle to environmentally protect against entry into the vehicle of dust and weather when the sleeping compartment structure is expanded.

20. A temporary shelter according to claim 19 wherein the selectively openable and closeable closure means comprise means, filling a space between the sleeping compartment structure and the vehicle opening to substantially environmentally close the vehicle opening the selectively openable and closeable closure means being stored within the container with the canopy covering and support structure when collapsed.

21. A manually totable temporary shelter comprising an expandable and collapsible sleeping compartment forming canopy covering and support structure, the canopy covering and the support structure being assembled for unitary rectilinear displacement between manually collapsed and manually extended positions, the temporary shelter comprising means releasibly attachable to a vehicle adjacent an opening therein when the canopy covering and the support structure are to be unitarily extended;

the temporary shelter further comprising a manually liftable and transportable container comprising an interior, handle means, releasible latch means, and means associating the interior of the container with the canopy covering and the support structure whereby the canopy covering and the support structure can be extended unitarily entirely from within and collapsed unitarily entirely into the container and the container, when closed and secured by the releasible latch means with the unitarily collapsed canopy covering and the support structure disposed entirely in the container, toted manually from place to place.

22. A manually portable temporary shelter according to claim 21 wherein the support structure comprises extendable/collapsible column supports which when extended engage terrain so that the extended support structure exclusive of the column supports is disposed above the terrain.

23. A manually portable temporary shelter according to claim 22 wherein the column supports comprise adjustable telescopic extendable/collapsible means by which a sleeping space can be made to be horizontal independent of variations in the terrain.

24. A manually portable temporary shelter according to claim 21 wherein the support structure comprises extendable/collapsible platform means which when rectilinearly extended are disposed along a bottom of the extendable and collapsible sleeping compartment.

25. A manually portable temporary shelter according to claim 24 wherein the platform means comprise foldable segments which extend and collapse in an accordion-like fashion.

26. A manually portable temporary shelter according to claim 25 wherein the platform means comprise segments and interconnecting means therebetween accommodating bi-directional folding into and from multiple layered stacked relation.

27. A manually portable temporary shelter according to claim 21 wherein the container further comprises means which can be selectively manually separated from each other for relative rectilinear translation and extended disposition at opposed ends of the sleeping compartment.

28. A manually portable temporary shelter according to claim 27 wherein the component of the container at one end of the extended sleeping compartment means comprises means for temporary connection to and disconnection from the vehicle adjacent the opening therein.

29. A manually portable temporary shelter according to claim 21 wherein the canopy covering and the support structure when extended define access opening means by which at least one person enters and exits the sleeping compartment.

30. A manually portable temporary shelter according to claim 21 wherein the canopy covering and the support structure when extended define access opening means by which at least one person enters and exits from the vehicle.

31. A manually portable temporary shelter according to claim 21 wherein the canopy means comprise window means.

32. A manually portable temporary shelter according to claim 31 wherein the window means comprise skylight means.

33. A manually portable temporary shelter according to claim 21 wherein the canopy covering comprises a collapsible sheet material.

34. A manually portable temporary shelter according to claim 21 further comprising superstructure which extends upwardly and engages and holds the canopy covering erect and taut when the canopy covering is extended to define a sleeping space.

35. A manually portable temporary shelter according to claim 21 wherein one end of the canopy covering comprises selectively openable/closeable closure means, the closure means when closed spanning across said vehicle opening.

36. A manually portable temporary shelter according to claim 21 further comprising anchor means which comprise guide rail means permanently attached to a bottom of said container and stationary rail means affixed to a floor of the vehicle and interrelated with the guide rail means providing for displacement of the container between manually collapsed and manually extended positions, one forward within the vehicle and one rearward directly adjacent the vehicle opening.

37. A manually totable temporary shelter comprising an expandable and collapsible sleeping compartment forming canopy covering and support structure, the canopy covering and the support structure being assembled for unitary rectilinear displacement between manually collapsed and manually extended positions, the temporary shelter further comprising means releasibly attachable to a vehicle adjacent an opening therein when the canopy covering and the support structure are unitarily extended;

the temporary shelter further comprising a manually liftable and transportable container comprising an interior, releasible latch means, and means associating the interior of the container with the canopy covering and the support structure whereby the canopy covering and the support structure can be extended unitarily entirely from within and collapsed unitarily entirely into the container and the container, when closed and secured by the releasible latch means with the unitarily collapsed canopy covering and support structure disposed entirely in the container, toted manually from place to place;

the canopy covering further comprising selectively openable and closeable closure means which, when closed, extend across the opening in the vehicle to environmentally protect against entry of undesired dust and weather into the vehicle through the opening when the sleeping compartment is expanded.

38. A manually totable temporary shelter according to claim 37 wherein the closure means comprise hook and loop fastener means interposed between the vehicle adjacent the opening and the canopy covering to provide said dust and weather protection as well as human access to the sleeping compartment.

39. A manually transportable sleeping compartment system which, in use, essentially extends in a horizontal orientation above terrain, said system comprising:

hand-held exterior casing means comprising handle means for toting the container and any contents therein from place to place and means for opening, closing, and releasibly latching the casing means in a closed state;

a collapsible/extendable canopy covering comprising collapsible sheet material having weight and by which an interior sleeping space is defined by top and side wall means of the canopy covering;

collapsible/extendable support structure comprising means holding the canopy covering in said horizontal orientation above the ground when extended; and means connecting the canopy covering and the support structure in such a way that the support structure and canopy covering extend and collapse together in a rectilinear horizontally directed fashion entirely into and entirely from the casing means;

the support structure comprising collapsible/extendable terrain engaging column means by which the weight of the canopy covering and any person occupying the sleeping space is transfer to the terrain.

40. A manually transportable sleeping compartment system which, in use, essentially extends in a horizontal orientation above ground through an opening in a vehicle, said system comprising hand-held exterior casing means comprising handle means for toting the container and any contents therein from place to place and for opening, closing, and releasibly latching the container means;

collapsible/extendable covering means comprising collapsible sheet material and support structure by which an interior sleeping space is defined by top and side wall means of the canopy covering, the covering means being displaceable entirely into and from the casing means; and releasible closure means which protect against undesired entry of dust and elements of weather into the vehicle through the opening.

41. A manually transportable sleeping compartment system which, in use, essentially extends from an opening in a vehicle wall beyond the vehicle in a horizontal disposition above terrain, the said system comprising:

manually transportable openable container means accommodating manually removal of the sleeping compartment system from and loading into the vehicle, the container means further comprising an interior space;

a collapsible/extendable canopy covering comprising collapsible sheet materials by which an interior sleeping space is defined by top and side wall means of the canopy covering;

collapsible/extendable support structure unitarily moveable with the canopy covering and comprising means holding the canopy covering in said horizontal orientation above the terrain when extended from the vehicle opening;

the support structure comprising collapsible/extendable terrain engaging column means; and means which affix a portion of the canopy covering to the vehicle adjacent the opening during extension and use.

42. A method for providing a temporary shelter comprising a wide sleeping compartment used in conjunction with a closeable opening in a vehicle at a desired site comprising the steps of:

placing a manually portable closed sleeping compartment container having a collapsed canopy covering and support structure disposed therein in the vehicle;

transporting the vehicle and the closed container in the vehicle to the desired site;

when at the desired site, causing the closeable opening in the vehicle to be opened;

opening the container for access to the canopy covering and support structure;

releasibly associating a portion of the canopy covering with the vehicle adjacent the opening;

essentially rectilinearly unitarily extending the canopy covering and the support structure horizontally to a fully extended position; and interposing column supports comprising part of the support structure between terrain and the remainder of the extended support structure by moving each column support from a collapsed to an extended position.

43. A method for providing a temporary shelter comprising a sleeping compartment extension to a vehicle comprising the steps of:

manually carrying a container to the vehicle;

associating the container with an opening in the vehicle;

opening the container;

unitarily extending a collapsible/extendable canopy covering and collapsible/extendable canopy support structure from entirely within the container rectilinearly in a generally horizontal direction beyond the vehicle above terrain to an extended position;

causing the canopy covering to be erect and taut to define a sleeping space therein; and interposing load-transmitting legs between the extended support structure and the terrain beneath the canopy covering.

44. A method of providing a temporary shelter comprising a sleeping compartment, comprising the steps of:

manually carrying a container to a desired site;

opening the container;

unitarily extending both a collapsible/extendable canopy covering and collapsible/extendable canopy support structure from entirely within the container rectilinearly in a generally horizontal direction to an extended position;

causing the canopy covering to be erect and taut to define an enclosed sleeping space therein;

unitarily collapsing both the canopy covering and the support structure substantially rectilinearly in a general horizontal direction to a location entirely within the container;

closing the container; and manually carrying the container away from the desired site.

* * * * *